(12) United States Patent
Wojdyl et al.

(10) Patent No.: US 11,645,597 B2
(45) Date of Patent: *May 9, 2023

(54) NETWORK SERVER FOR SEGMENTING AND SCHEDULING

(71) Applicant: Hartford Fire Insurance Company, Hartford, CT (US)

(72) Inventors: Wendy A. Wojdyl, West Hartford, CT (US); Hope C McManus, Simsbury, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/337,716

(22) Filed: Jun. 3, 2021

(65) Prior Publication Data

US 2021/0287153 A1    Sep. 16, 2021

Related U.S. Application Data

(63) Continuation of application No. 14/969,689, filed on Dec. 15, 2015, now Pat. No. 11,068,818.

(51) Int. Cl.
| | |
|---|---|
| *G06Q 10/06* | (2023.01) |
| *G06Q 10/0631* | (2023.01) |
| *H04L 67/1097* | (2022.01) |
| *H04L 67/60* | (2022.01) |

(52) U.S. Cl.
CPC ... *G06Q 10/06314* (2013.01); *H04L 67/1097* (2013.01); *H04L 67/60* (2022.05)

(58) Field of Classification Search
CPC ..... G06Q 10/06314; G06Q 10/063112; G06Q 30/0201; G06Q 30/0202; G06Q 30/0203;
(Continued)

(56) References Cited

U.S. PATENT DOCUMENTS

| | | | |
|---|---|---|---|
| 6,332,125 B1 * | 12/2001 | Callen | G06Q 40/08 705/400 |
| 7,860,744 B2 * | 12/2010 | Libman | G06Q 30/0251 705/14.66 |

(Continued)

FOREIGN PATENT DOCUMENTS

WO    WO-2007092561 A2 *    8/2007    ............. G06Q 40/00

OTHER PUBLICATIONS

Bundorf, M. Kate. "Employee demand for health insurance and employer health plan choices." Journal of Health Economics 21.1 (2002): 65-88. (Year: 2002).*

(Continued)

*Primary Examiner* — Patricia H Munson
*Assistant Examiner* — Hamzeh Obaid
(74) *Attorney, Agent, or Firm* — Buckley, Maschoff & Talwalkar LLC

(57) ABSTRACT

According to some embodiments, a communication device database may store information about a plurality of communication devices, including at least one communication address associated with each communication device, wherein each communication device is associated with a resource unit. Moreover, a network based segmentation server may access information in a resource status database, automatically assign each resource unit to a resource segment based on at least one pre-determined algorithm and information in the resource status database, and transmit information about the resource segments. A scheduling server, coupled to the segmentation server, may receive the information about the resource segments from the segmentation server, automatically schedule a series of communication events with communication devices in accordance with the resource segments, using the communication addresses, via the distributed communication network, and (Continued)

arrange for communication links to be established for resource units in accordance with the scheduled series of communication events.

20 Claims, 24 Drawing Sheets

(58) Field of Classification Search
CPC ............ G06Q 30/0204; G06Q 3/0205; G06Q 30/0206; H04L 67/1097; H04L 67/32; G16H 40/20
See application file for complete search history.

(56) References Cited

U.S. PATENT DOCUMENTS

| | | | |
|---|---|---|---|
| 2003/0187768 A1* | 10/2003 | Ryan | G06Q 40/08 705/35 |
| 2011/0119094 A1* | 5/2011 | Joao | G06Q 40/00 705/322 |
| 2014/0067706 A1* | 3/2014 | Mun | G06Q 10/1057 705/322 |
| 2014/0114872 A1* | 4/2014 | Morgan | G06Q 40/08 705/322 |
| 2014/0358591 A1* | 12/2014 | Gray | G06Q 40/08 705/4 |
| 2016/0012194 A1* | 1/2016 | Prakash | G16H 40/40 705/2 |
| 2017/0004260 A1* | 1/2017 | Moturu | G16H 10/60 |

OTHER PUBLICATIONS

Dror, David Mark, et al. "Health insurance benefit packages prioritized by low-income clients in India: three criteria to estimate effectiveness of choice." Social Science & Medicine 64.4 (2007): 884-896. (Year: 2007).*

* cited by examiner

NETWORK SERVER FOR SEGMENTING AND SCHEDULING

CROSS-REFERENCE TO RELATED APPLICATION

The present application is a continuation of U.S. patent application Ser. No. 14/969,689 entitled "NETWORK SERVER FOR SEGMENTING AND SCHEDULING" and filed Dec. 15, 2015. The entire content of that application is incorporated herein by reference.

FIELD

The present invention relates to computer systems and more particularly to a network server that may be utilized in connection with automatic resource unit segmenting and scheduling.

BACKGROUND

In applications associated with distributed communication networks, it may be important to help facilitate and/or schedule a series of communication events with resource units. For example, different types of resource units may respond to and/or react to different types and timings of communication events. Determining an appropriate schedule to achieve the best results from resource units, however, can be a time consuming and error prone task—especially when there are a substantial number of resource units (and associated communication devices) of many different types. It would therefore be desirable to provide systems and methods to facilitate the automated scheduling of a series of communication events with resource units.

SUMMARY

A system is disclosed wherein a communication device database may store information about a plurality of communication devices, including at least one communication address associated with each communication device, wherein each communication device is associated with a resource unit. Moreover, a segmentation server may access information in a resource status database, automatically assign each resource unit to a resource segment based on at least one pre-determined algorithm and information in the resource status database, and transmit information about the resource segments. A scheduling server, coupled to the segmentation server, may receive the information about the resource segments from the segmentation server, automatically schedule a series of communication events with communication devices in accordance with the resource segments, using the communication addresses, via the distributed communication network, and arrange for communication links to be established for resource units in accordance with the scheduled series of communication events.

By facilitating the automated scheduling of a series of communication events with resource units, embodiments may provide improved data exchange over a distributed communication network.

With these and other advantages and features of the invention that will become hereinafter apparent, the invention may be more clearly understood by reference to the following detailed description of the invention, the appended claims, and the drawings attached hereto.

DETAILED DESCRIPTION

The present invention provides significant technical improvements to facilitate an ability to schedule a series of communication events with resource units. The present invention is directed to more than merely a computer implementation of a routine or conventional activity previously known in the industry as it significantly advances the technical efficiency, access and/or accuracy of data created by devices described in connection with some embodiments by implementing a specific new method and system as defined herein. The present invention is a specific advancement in the areas of segmentation server, scheduling servers, and/or monitoring by providing technical benefits in data accuracy, data availability, data transparency, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized back-end, client, and/or third-party systems, networks, and subsystems. For example, in the present invention information may be transmitted to automatically schedule communication links with identified communication devices, and such events may be facilitated as appropriate in an accurate and transparent manner.

Figure 1:
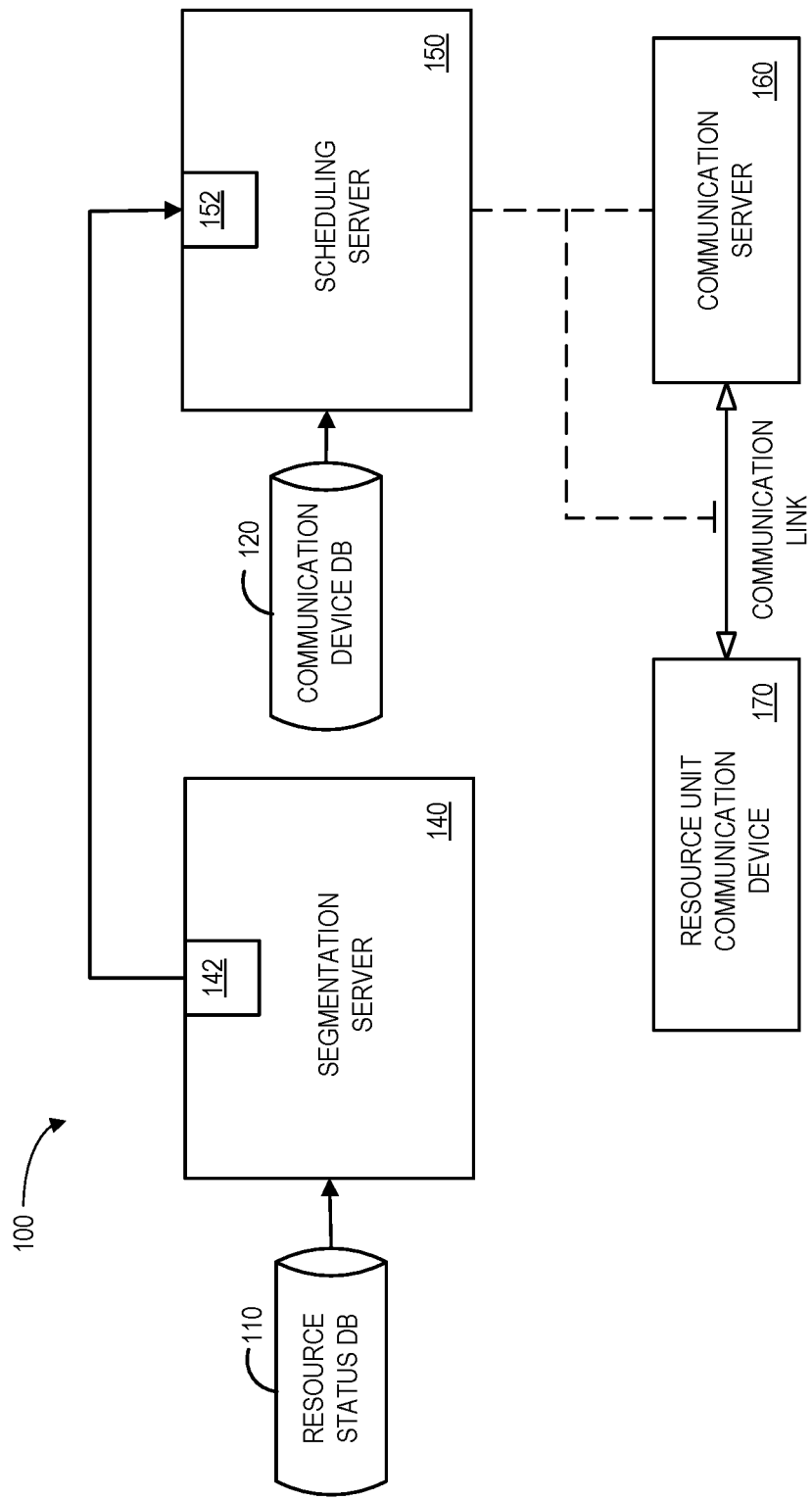
FIG. 1 is a high level block diagram that illustrates a system in accordance with some embodiments.

Some embodiments described herein may facilitate an ability to schedule a series of communication events. Further, some embodiments may provide a mechanism that automates an interface that might be used, for example, by operators and/or administrators of an enterprise computer server and/or a monitoring device. FIG. 1 is block diagram of a system 100 according to some embodiments of the present invention. In particular, the system 100 includes a segmentation server 140, coupled to a resource status database 110, that exchanges information with a scheduling server 150 that may store information into and/or retrieve information from a communication database 120.

The segmentation server 140 and/or scheduling server 150 might be, for example, associated with a Personal Computers ("PC"), a web portal, a laptop computer, an enterprise server, a server farm, and/or a database or similar storage devices. The segmentation server 140 and/or scheduling server 150 may, according to some embodiments, further include a rules engine and/or rendering component as described herein.

According to some embodiments, an "automated" segmentation server 140 and/or scheduling server 150 may help facilitate communications between a communication server 160 and a resource unit communication device 170 to facilitate the scheduling of a series of communication events. For example, the segmentation server 140 and/or scheduling server 150 may automatically establish communication links between the communication server 160 and the resource unit communication device 170 (e.g., a pre-determined period of time before a deadline). As used herein, the terms "automated" and "automatically" may refer to, for example, actions that can be performed with little (or no) intervention by a human.

As used herein, devices, including those associated with the segmentation server 140 and/or scheduling server 150 (or any other device described herein), may exchange information via any distributed communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The segmentation server 140 and/or scheduling server 150 may store information into and/or retrieve information from the databases 110, 120. The databases 110, 120 might be locally stored or reside remote from the segmentation server 140 and/or scheduling server 150. According to some embodiments, the segmentation server 140 and/or scheduling server 150 exchanges information about information in the databases 110, 1200, such as by forwarding an electronic file or signal to an electronic transaction system, an electronic messaging communication server, and/or an external platform (e.g., a workflow management system, calendar application, etc.).

Note that the segmentation server 140 and scheduling server 150 might communicate via one or more communication ports 142, 152. Further note that these ports 142, 152 might comprise a single device, might provide electronic security measures for a distributed communication network (e.g., a firewall), and/or might provide load balancing services (e.g., arranging for multiple processors and/or programming instances to process information simultaneously) according to some embodiments.

Although a single segmentation server 140 and scheduling server 150 are shown in FIG. 1, any number of such devices may be included. Moreover, various devices described herein might be combined according to embodiments of the present invention. For example, in some embodiments, the segmentation server 140 and scheduling server 150 might be co-located and/or may comprise a single apparatus.

Figure 2:
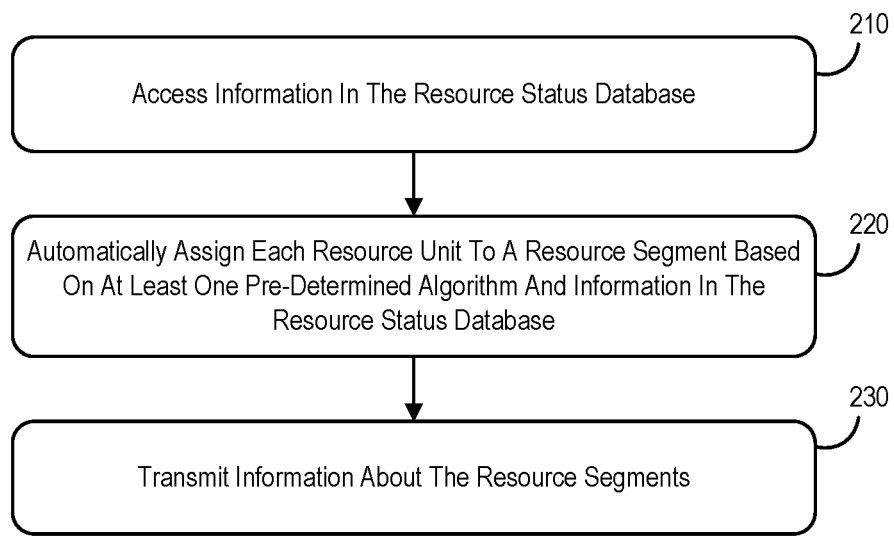
FIG. 2 is a flow chart that illustrates a segmentation server process that may be performed according to some embodiments.

FIG. 2 illustrates a method that might be performed, for example, by the segmentation server of the system 220 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 210, a segmentation server, in communication with a resource status database and a resource status database, may access information in the resource status database. At 220, the segmentation server may automatically assign each resource unit to a resource segment (e.g., of a set of potential resource segments) based on at least one pre-determined algorithm and information in the resource status database. According to some embodiments, the pre-determined algorithm is associated with a predictive model. According to some embodiments, the pre-determined algorithm is based on historical buying behaviors associated with voluntary purchases of group benefit insurance products. At 230, the segmentation server may transmit information about the resource segments (e.g., to the scheduling server).

Figure 3:
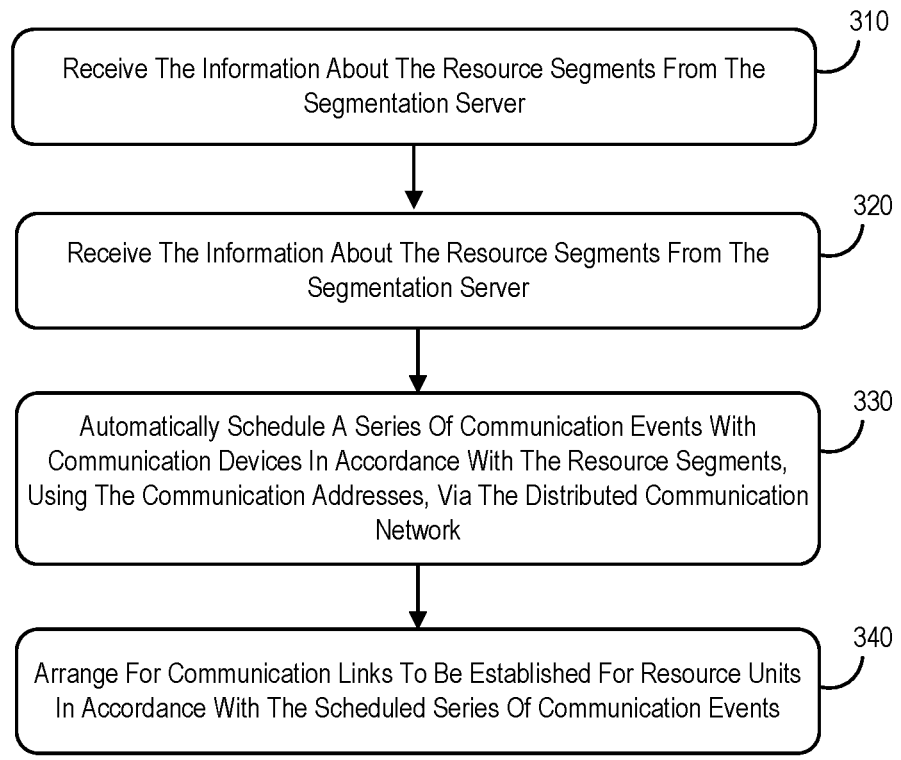
FIG. 3 is a flow chart that illustrates a scheduling server process that may be performed according to some embodiments.

FIG. 3 illustrates a method that might be performed, for example, by the scheduling server 150 of the system 100 described with respect to FIG. 1 according to some embodiments. At 310, the scheduling server may receive a selection of a subset of the set of potential resource segments. For example, an administrator might indicate that he or she is particularly interested in two out of a total of five potential resource segments. At 320, the scheduling server (which may be coupled to the communication device database) might receive the information about the resource segments assigned to each of the selected subset of potential resource segments from the segmentation server. At 330, the scheduling server may automatically schedule a series of communication events with communication devices in accordance with the resource segments assigned to the selected subset of potential resource segments, using communication addresses from the communication device database, via the distributed communication network. According to some embodiments, the distributed communication network is associated with at least one of a public switched telephone network, the Internet, and a web portal. Moreover, the phrase "communication device" might refer to, for example, a telephone, a personal computer, a smartphone, a smartwatch, a tablet computer, and/or a chat interface (e.g., adapted to exchange text, audio, and/or video messages). Note that communication device database may, for example, store information about a plurality of communication devices associated with resource units, including at least one communication address associated with each communication device. At 340, the scheduling server may arrange for communication links to be established for resource units assigned to the selected subset of potential resource segments in accordance with the scheduled series of communication events. As used herein, the phrase "arrange for communication links to be established" might refer to, for example, automatically establishing such links, making recommendations about the timing of such links, providing an appropriate template to schedule such links, describing timing, messaging, and tactics appropriate for such links, etc.

Figure 4:
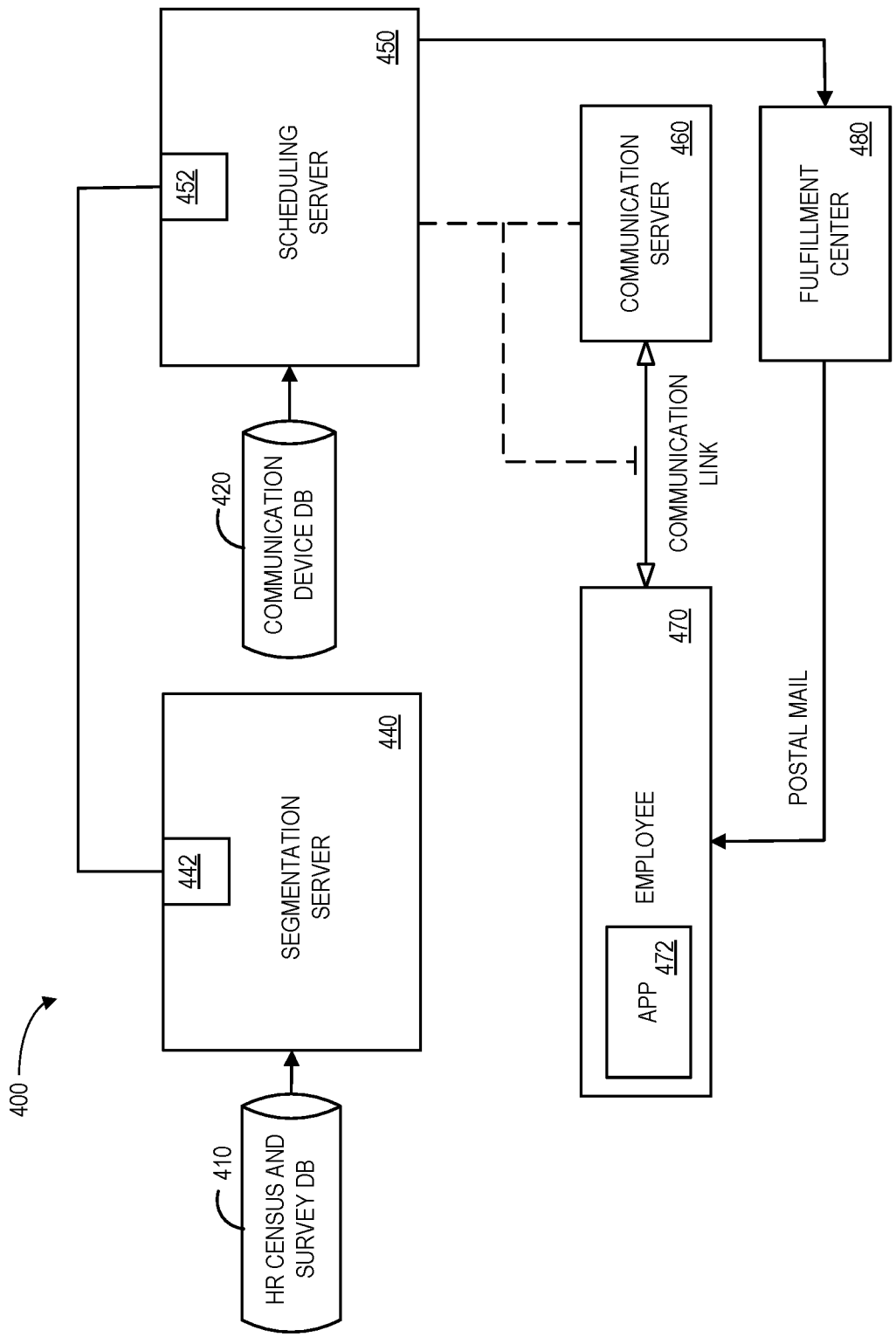
FIG. 4 is a block diagram that illustrates aspects of a computer system provided in accordance with some embodiments of the invention.

Some embodiments described herein might be associated with, for example, employees of an enterprise, such as a business. For example, FIG. 4 is block diagram of a computer system 400 according to such embodiments of the present invention. As before, the system 400 includes a segmentation server 440 (e.g., a network based server), coupled to a Human Resource ("HR") census and survey database 410, that exchanges information with a scheduling server 450 able to store information into and/or retrieve information from a communication device database 420.

The segmentation server 440 and/or scheduling server 450 might be, for example, associated with a PC, a web portal, a laptop computer, an enterprise server, a server farm, and/or a database or similar storage devices. The segmentation server 440 and/or scheduling server 450 may, according to some embodiments, further include a rules engine and/or rendering component as described herein.

According to some embodiments, an automated segmentation server 440 and/or scheduling server 450 may help facilitate a series of communication events between a communication server 460, such as one associated with an email application, and a communication device associated with an employee 470. The series of communication events might be related to, for example, one or more voluntary group benefit insurance plans being offered by an employer and/or an insurance company.

Note that the segmentation server 440 and scheduling server 450 might communicate via one or more communication ports 442, 452. Further note that these ports 442, 452 might comprise a single device, might provide electronic security measures for a distributed communication network (e.g., a firewall), and/or might provide load balancing services (e.g., arranging for multiple processors and/or programming instances to process information simultaneously) according to some embodiments.

Although a single segmentation server 440 and scheduling server 450 are shown in FIG. 4, any number of such devices may be included. Moreover, various devices described herein might be combined according to embodiments of the present invention. For example, in some embodiments, the segmentation server 440 and scheduling server 450 might be co-located and/or may comprise a single apparatus.

According to some embodiments, the segmentation server 440 may access information in the HR census and survey database 410. The information in the HR census and survey database 410 might include, for example, for each employee: an age, a gender, a marital status, etc. The segmentation server 440 may automatically assign each employee to a resource segment in accordance with one or more pre-determined criteria. For example, an employee might be classified as "up and coming," "an information seeker," a "budget stretcher," etc.

The scheduling server 450 might automatically schedule a series of communication events between the communication server 460 and the employee using a communication address (e.g., telephone number, email address, etc.) from the communication device database 420. The content and/or timing of the communication events may be based at least in part on the segment to which the employee was assigned. The scheduling server 450 may arrange for a communication link to be established in accordance with each of the scheduled series of communication events via a distributed communication network (e.g., a PSTN, Internet, and/or web portal). According to some embodiments, a software application 472 is associated with the communication device of the injured worker 470. The software application 472 might include, for example, workbook materials, training media, social media interaction functions, and/or insurance program enrollment functionality.

According to some embodiments, the scheduling server 450 may also automatically arrange for a physical item to be delivered to a postal address associated with an employee in connection with at least some of the scheduled series of communication events. This might be arranged, for example, by transmitting one or more electronic records from the scheduling server 450 to a fulfilment center 480 adapted to facilitate such deliveries. By way of examples only, the scheduling server 450 might automatically arrange for an enrollment package to be delivered as the first of a scheduled series of communication events when an employee is assigned to a "mature and secure" segment. As another example, the physical item might comprise training media (e.g., a CD containing material explaining various insurance products).

According to some embodiments, an enrollment optimization system may combine employee census driven data and voluntary enrollment analysis information, using proprietary research on voluntary consumer purchase patterns. This may reveal "personas" or "segments" of employees to understand the population in greater depth. The enrollment optimizer may provide a custom report with insights on the preferred ways employees want to learn and enroll in benefit programs. For example, the report might include: an employee snapshot, persona breakdown with benchmarking, a participation analysis, persona attributes, a communications strategy, and/or a communication plan and timeline template.

Figure 5:
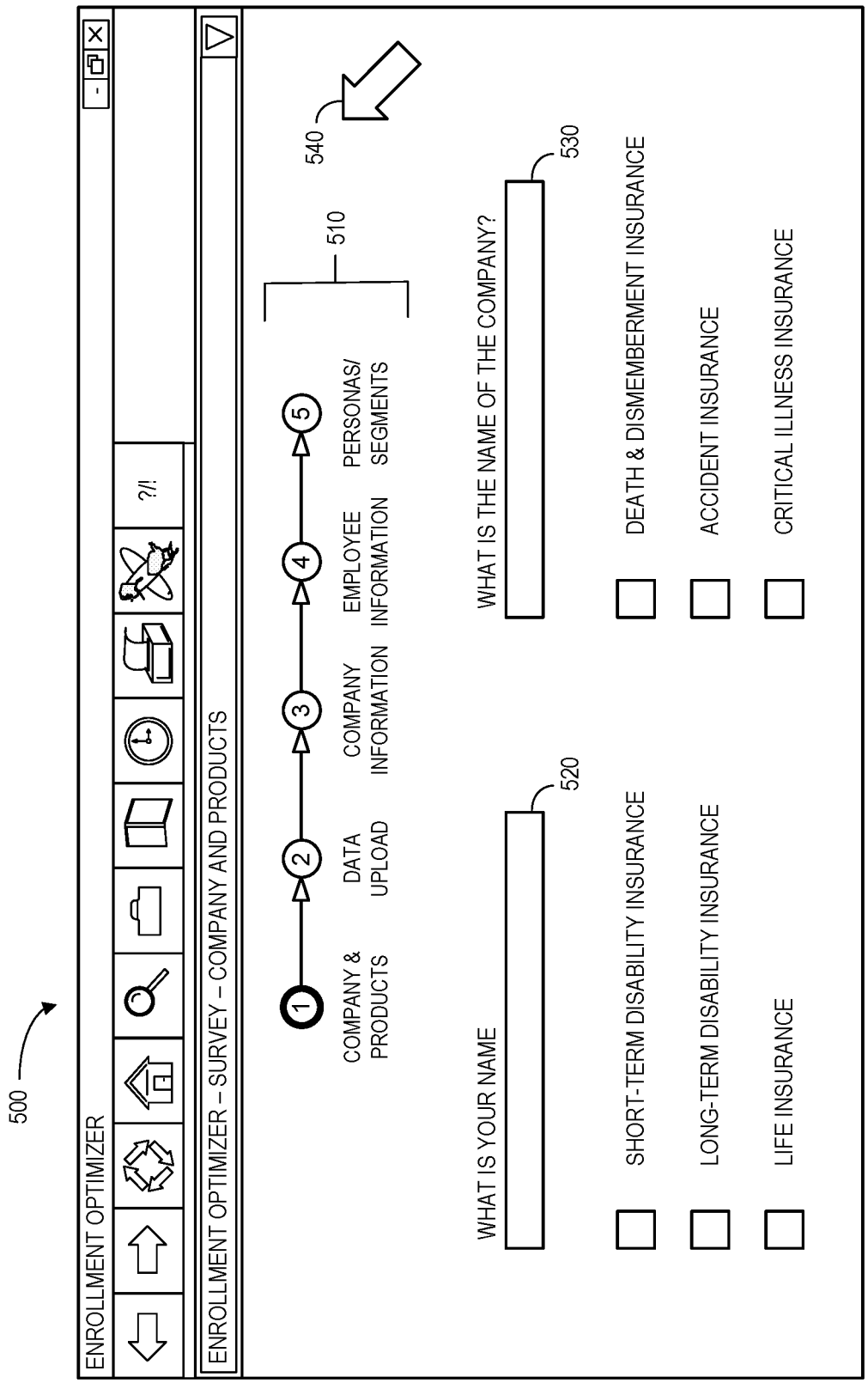
FIGS. 5 through 19 illustrate user interface displays in accordance with some embodiments.
Figure 6:
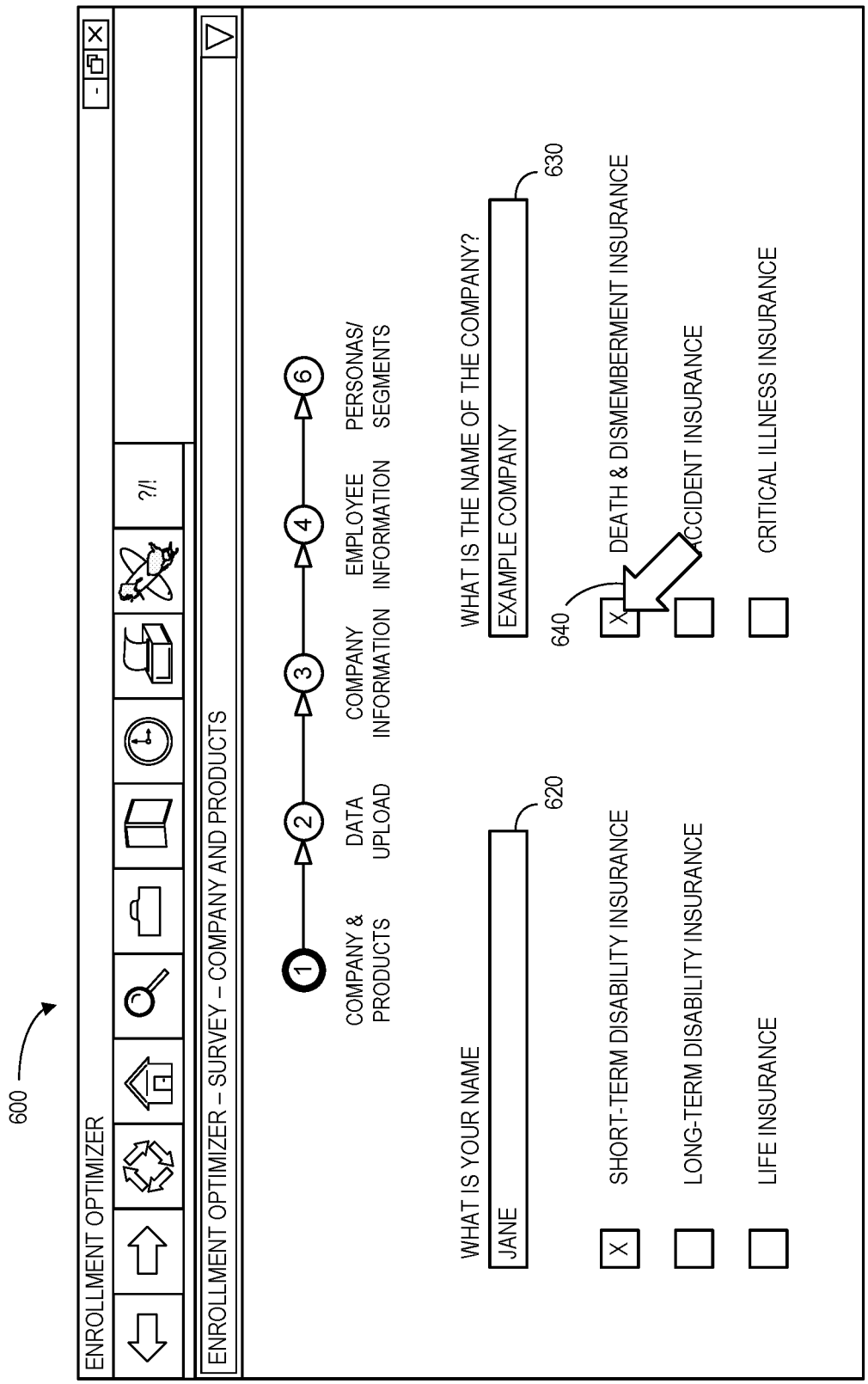

FIGS. 5 through 19 are examples of user interface displays that might be provided according to some embodiments. In particular, FIGS. 5 through 10 illustrate displays that may be used to enter information about an enterprise and employees who work for that enterprise. For example, FIG. 5 illustrates an insurance enrollment optimizer display 500. The display 500 includes a roadmap 510 of the data entry process, including: information about the company and products, a data upload, company information, employee information, and personas/segments of interest. The display 500 lets a user enter his or name 520 along with the name of the company 530. By moving a computer pointer 540 and making selections, the user can indicate which insurance products are of interest (e.g., short-term disability insurance, long-term disability insurance, life insurance, accidental death and dismemberment insurance, accident insurance, and/or critical illness insurance). For example, FIG. 6 illustrates such a display 600 after information has been entered by the user (in particular, his or name 620, company name 630, and use of the pointer 640 to select short-term disability insurance and death and dismemberment insurance).

Figure 7:
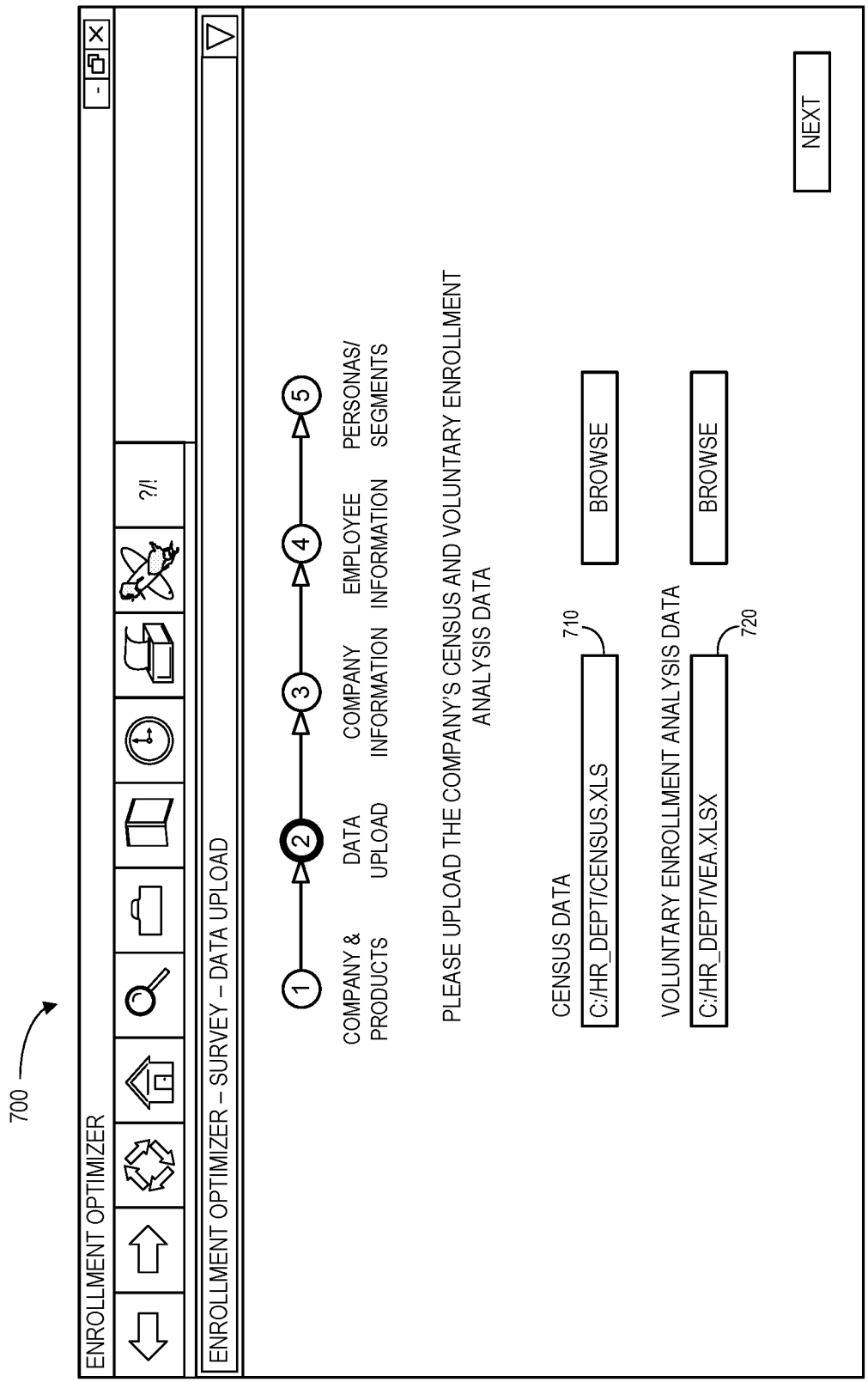

FIG. 7 illustrates a data upload display 700 in accordance with some embodiments. The upload display 700 may let a user to enter a file name and location for employee census data 710 and/or voluntary enrollment analysis data 720. According to some embodiments, the user may instead select to "browse" files until the appropriate spreadsheet application file is located. By way of example, the census data 710 might comprise a spreadsheet application file listing employee ages, genders, marital statuses, etc.

Figure 8:
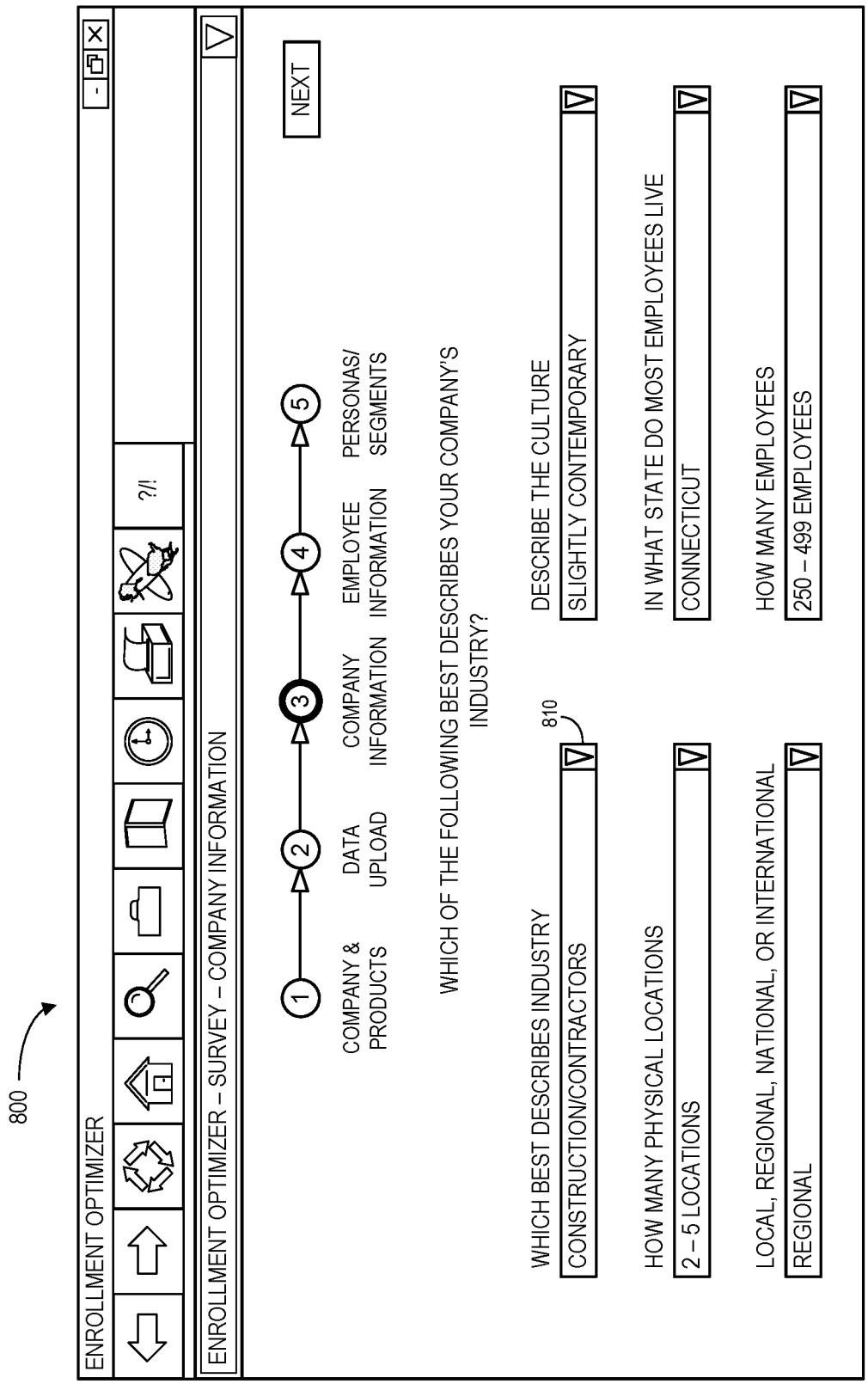

FIG. 8 illustrates a company information display 800 in accordance with some embodiments. The company information display 800 may include a number of questions 810 that can be answered via drop-down menu selections. Examples of information that might be entered via the display include: an industry description, a number of physical workplace locations, whether the company is global, regional, etc., a company culture description, a state in which most employees live, and/or an overall number of employees. According to some embodiments, default values are used when some or all of this information is not provided via the display 800.

Figure 9:
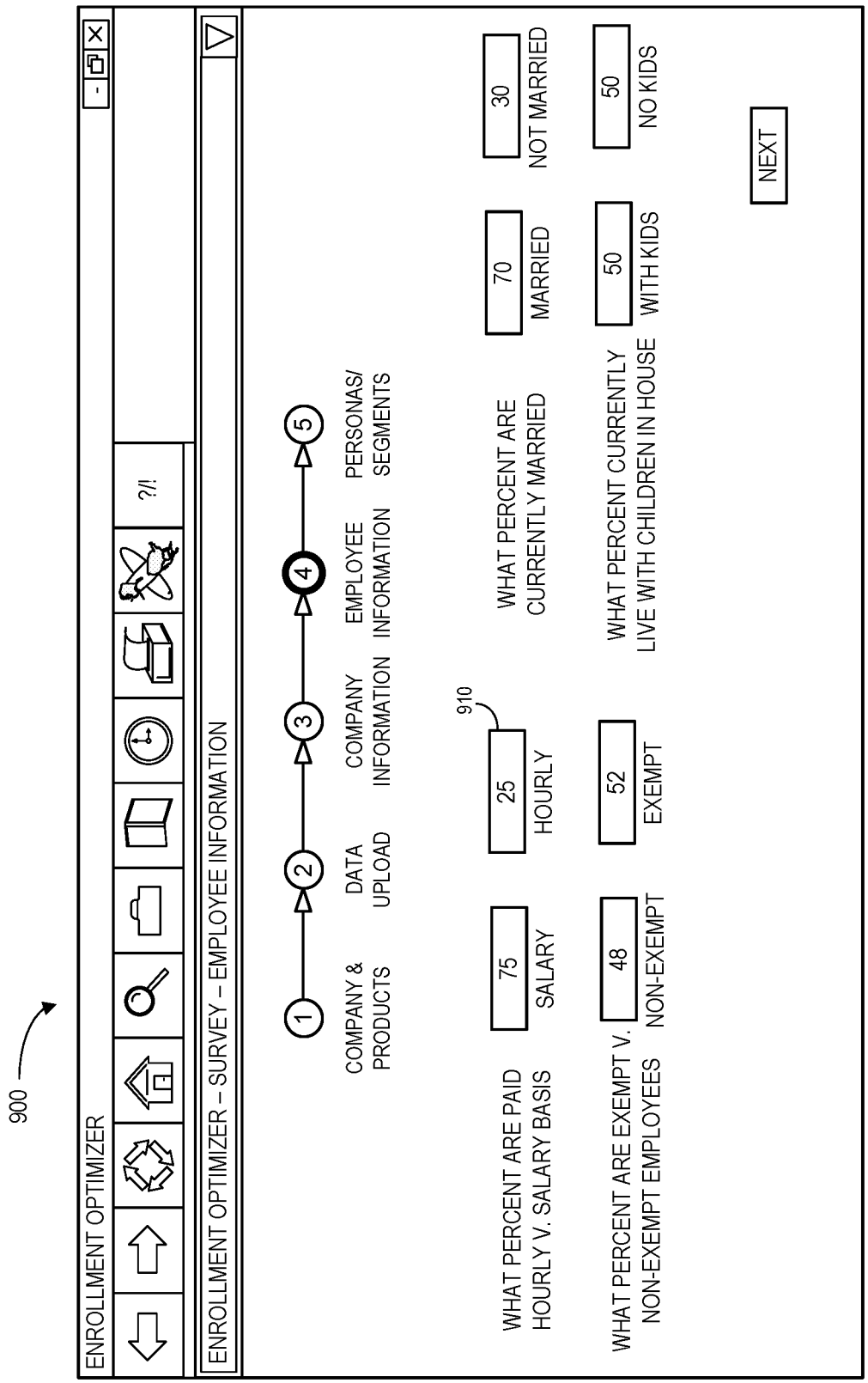

FIG. 9 illustrates an employee information display 900 in accordance with some embodiments. The employee information display 800 may include a number of questions 910 such that a user can enter a percentage break-down of employee statuses. Examples of questions 910 might include: paid v. hourly workers (e.g., 75 percent of our employees are paid via a salary while 25 percent are paid an hourly wage), exempt v. non-exempt workers, married an unmarried employees, workers who currently live with children at home, etc.

Figure 10:
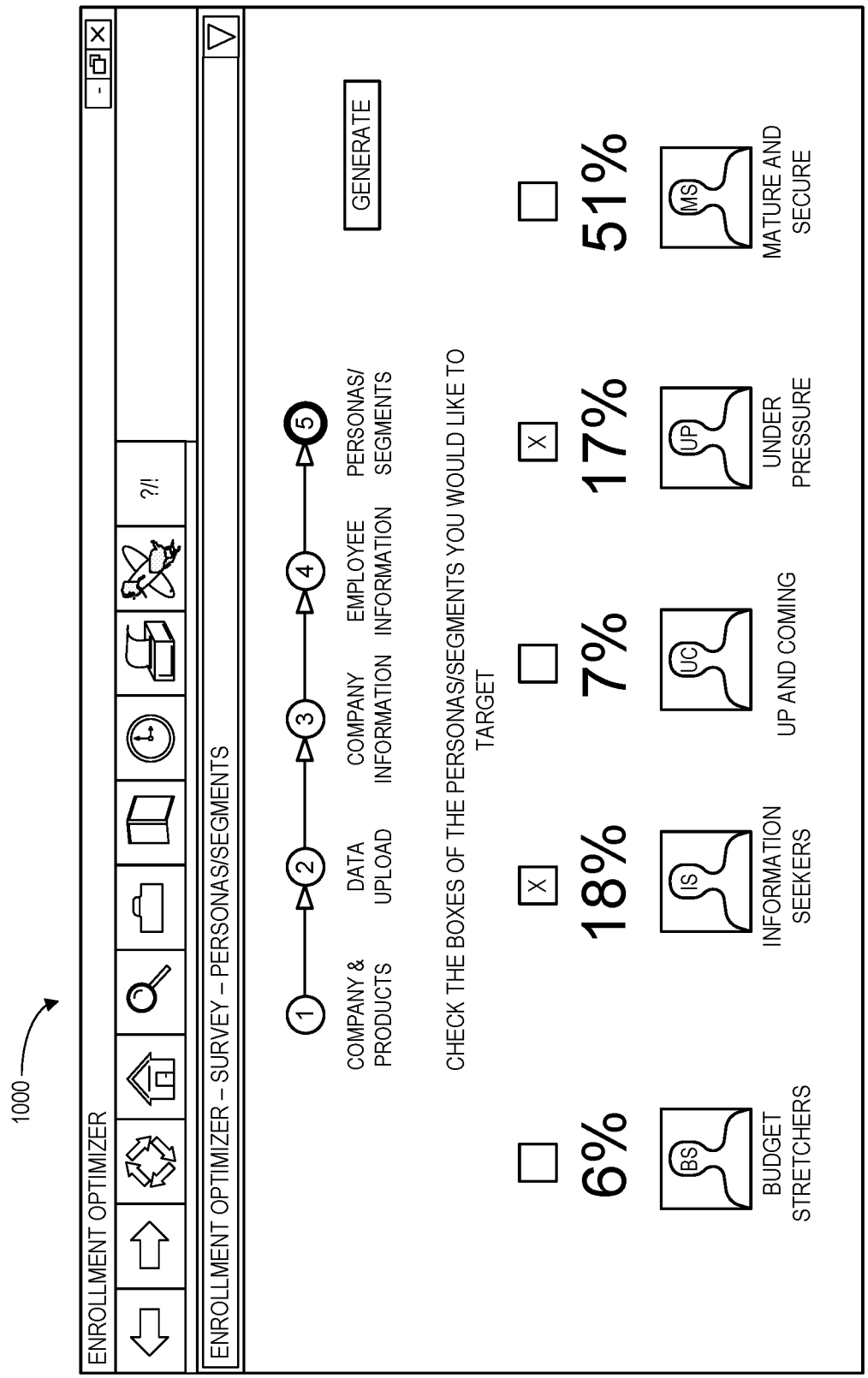

FIG. 10 illustrates a persona/segment display 1000 in accordance with some embodiments. According to some embodiments, the persona segment display 1000 might have used the previously provided information to estimate a breakdown of current employees into different personas or employee segments (each having different interests, preferences, purchasing habits, etc.). Moreover, the user may select one or more of the personas to be included in an automatically generated report. Examples of personas might include: "budget stretchers," "information seekers," "up and coming," "under pressure," and "mature and secure." When the personas are selected the user can activate a "generate" icon to receive the automatically generated report.

Figure 11:
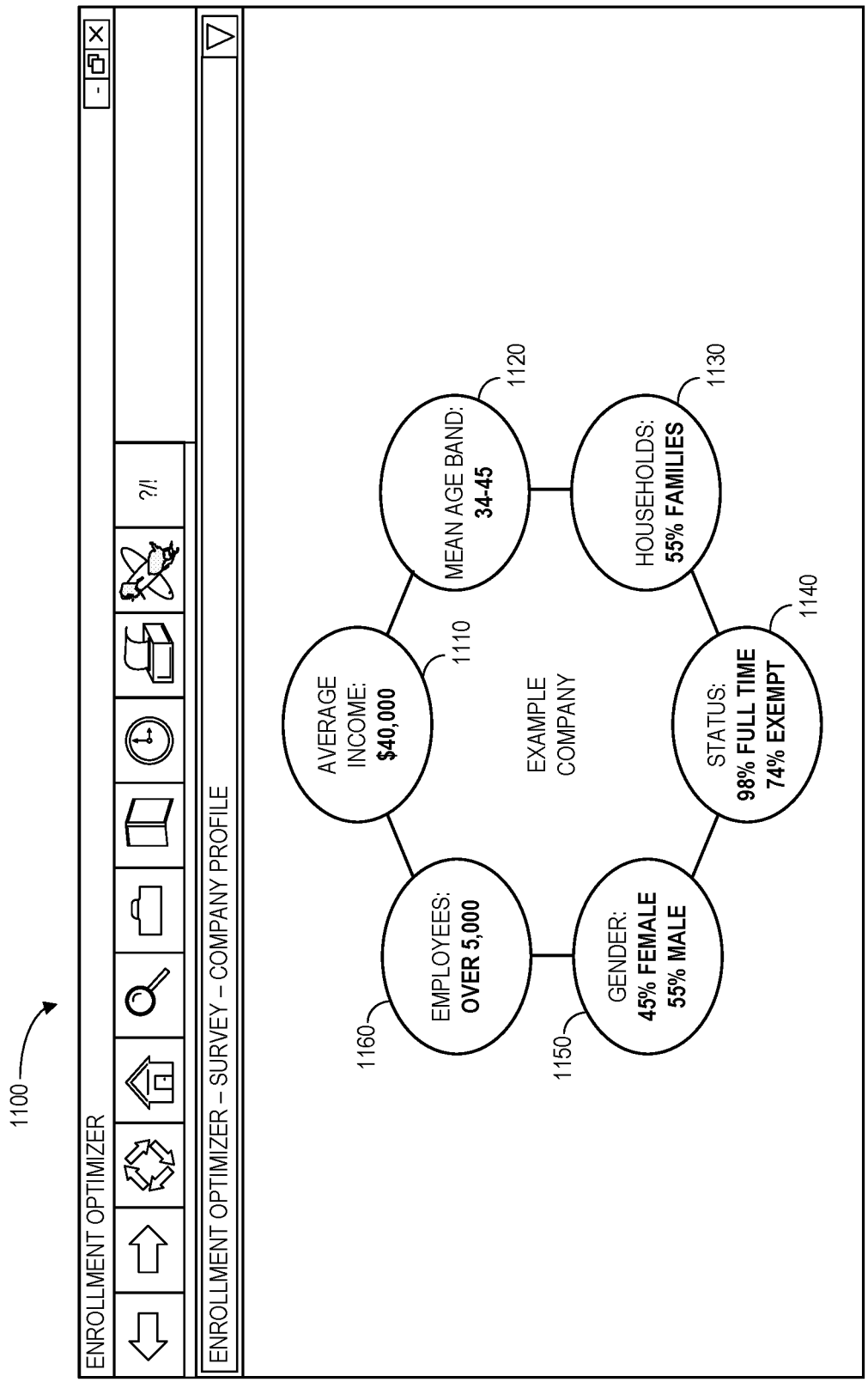

FIGS. 11 through 18 illustrate displays that may be used to provide automated enrollment optimization recommendations (e.g., in a report generated in response to the user's inputs described in connection with FIGS. 5 through 10). In particular, FIG. 11 illustrates a company profile display 1100 that might be provided in accordance with some embodiments. The company profile display 1100 might include, for example, a high level overview about the company and/or employees of the company. Examples of information that might be provided on the company profile display 1100 include: an average employee yearly income amount 1110, a mean age band 1120, a household breakdown 1130, a full time and/or exempt employee status 1140, gender information 1150, and/or a total number of employees 1160 (e.g., full time and/or part time employees).

Figure 12:
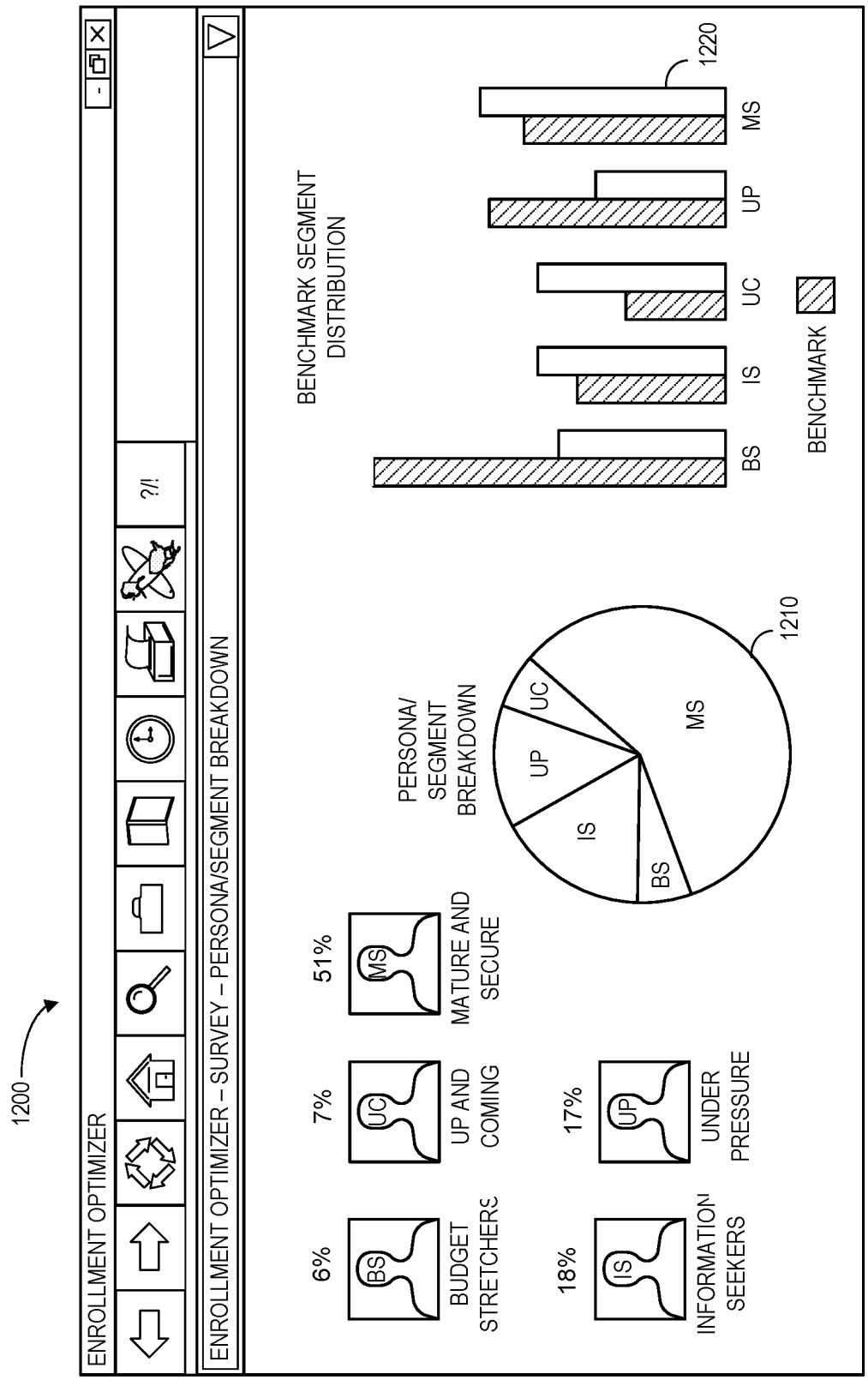

FIG. 12 illustrates a persona/segment breakdown display 1200 that might be provided in accordance with some embodiments. According to some embodiments, employees might be assigned to one of the following segments: "Budget Stretchers" ("BS"), "Information Seekers" ("IS"), "Up and Coming" ("UC"), "Under Pressure" ("UP"), and "Mature and Secure" ("MS"). The display 1200 may include a graphical representation 1210 of the number of employees in each category (e.g., via a pie chart) along with a benchmark segment distribution display 1220 (e.g., a bar graph for each persona or segment).

Figure 13:
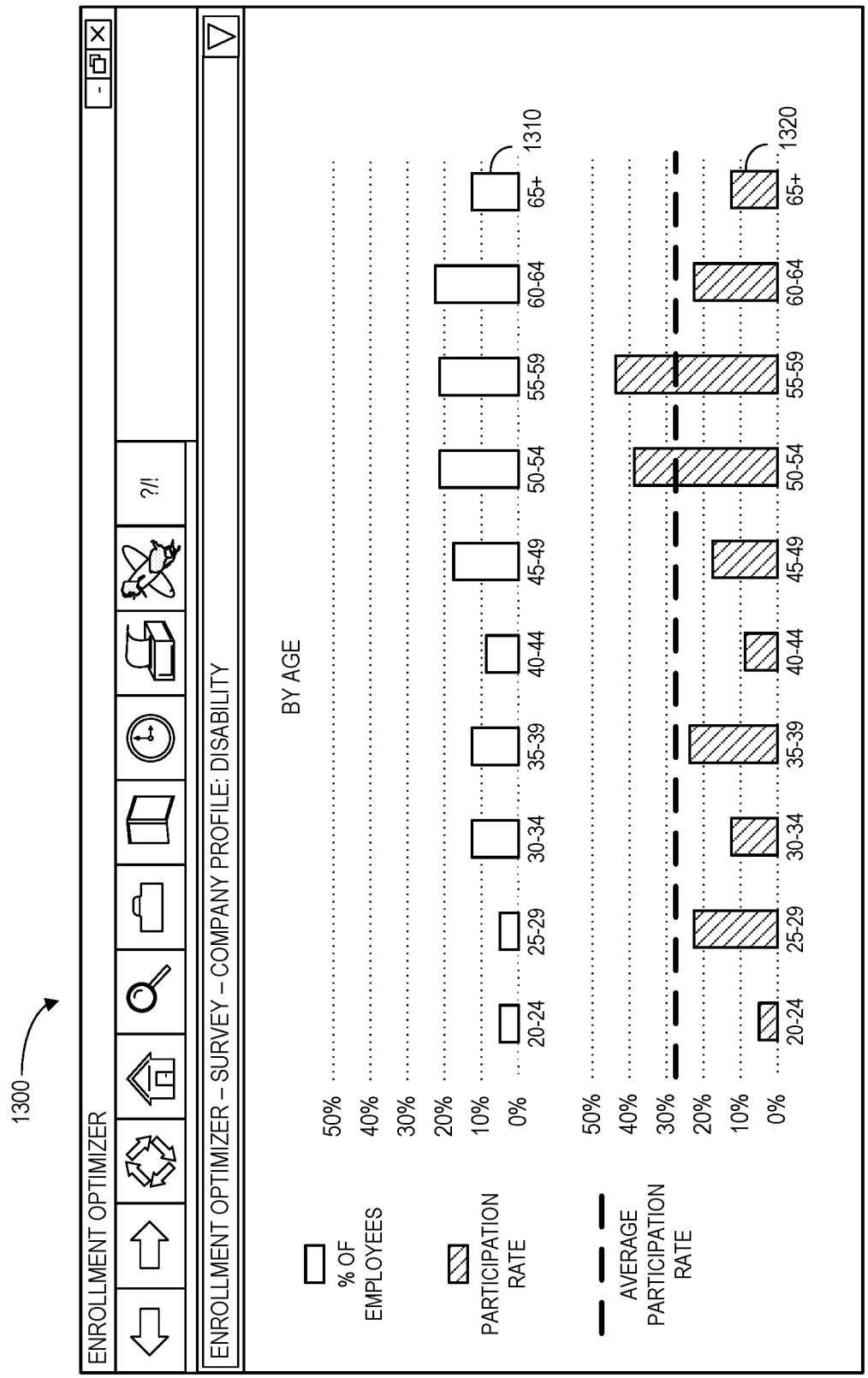

FIG. 13 illustrates a disability insurance-by-age enrollment or participation display 1300 that might be provided in accordance with some embodiments. For each age group, the display 1300 might indicate what percentage of employees fall within that age group 1310. Similarly, for each age group, the display 1300 might indicate a percentage of employees who have purchased disability insurance 1320. The display 1300 may further indicate an average participation rate for that type of insurance (e.g., to help a user target age groups that might be of particular interest). Although disability insurance and age groups are illustrated in FIG. 13, note that embodiments may be broken down in any number of different ways. For example, a display might be associated with a life insurance product broken down by employee yearly salary, or any other combination.

Figure 14:
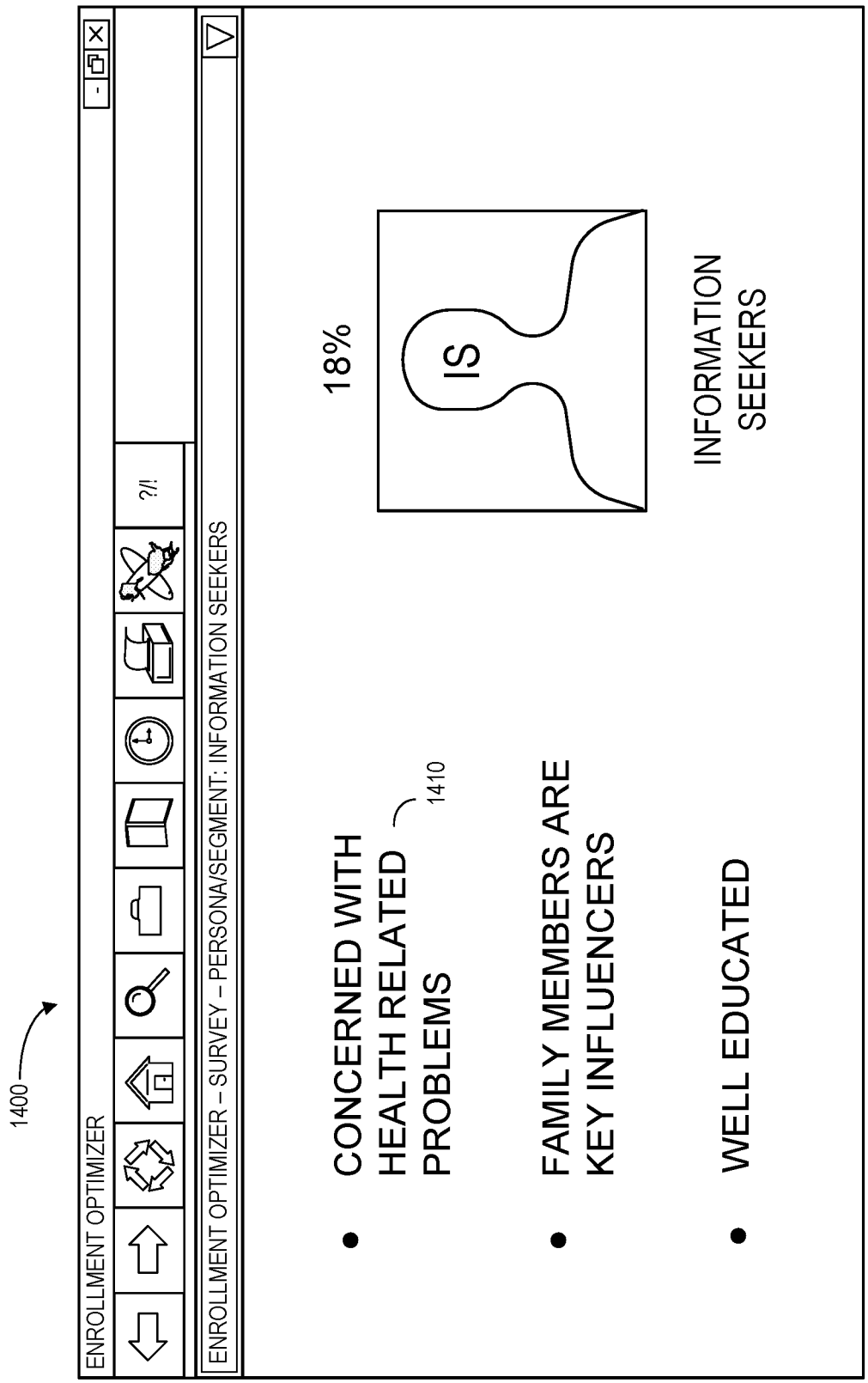
Figure 15:
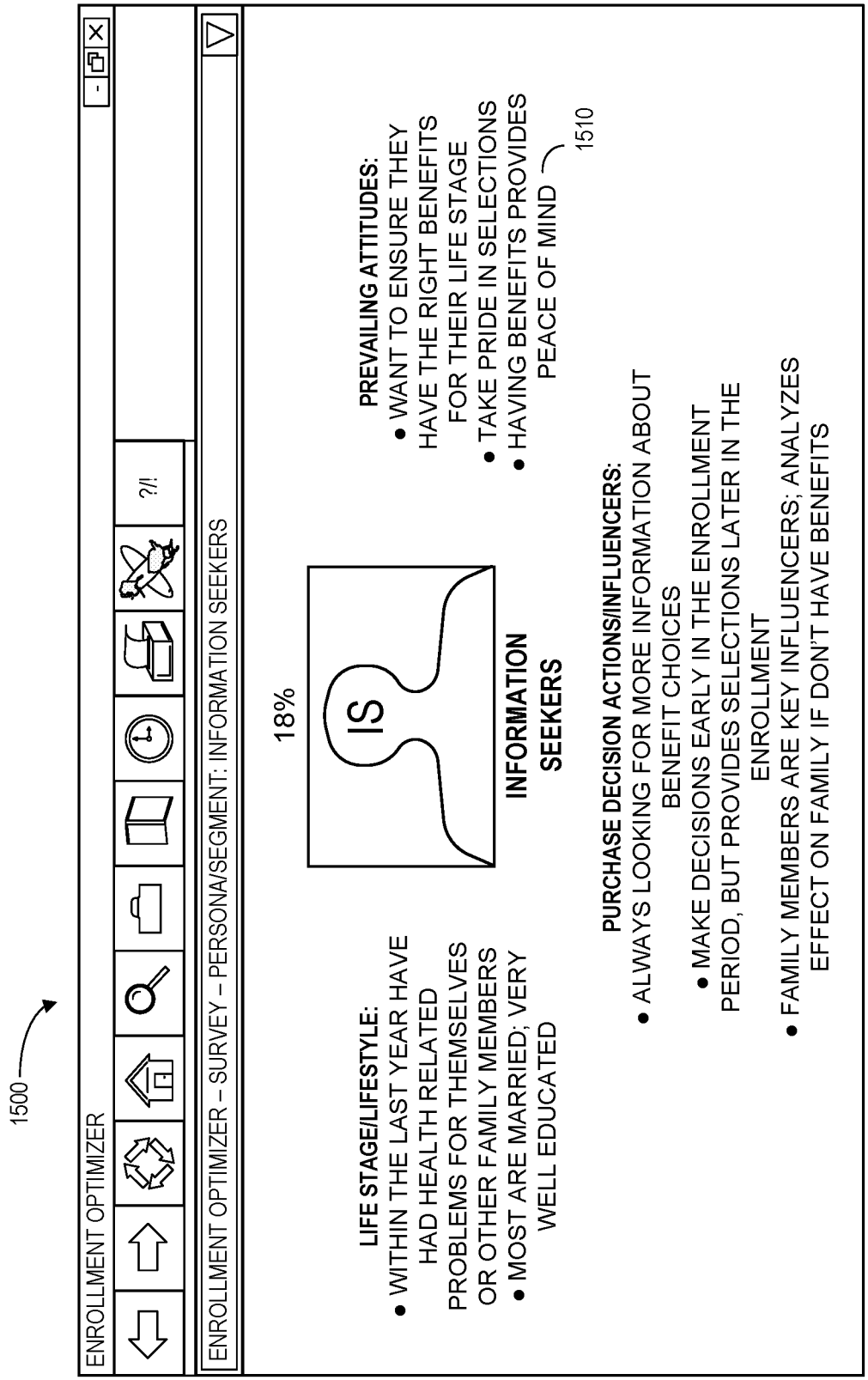
Figure 16:
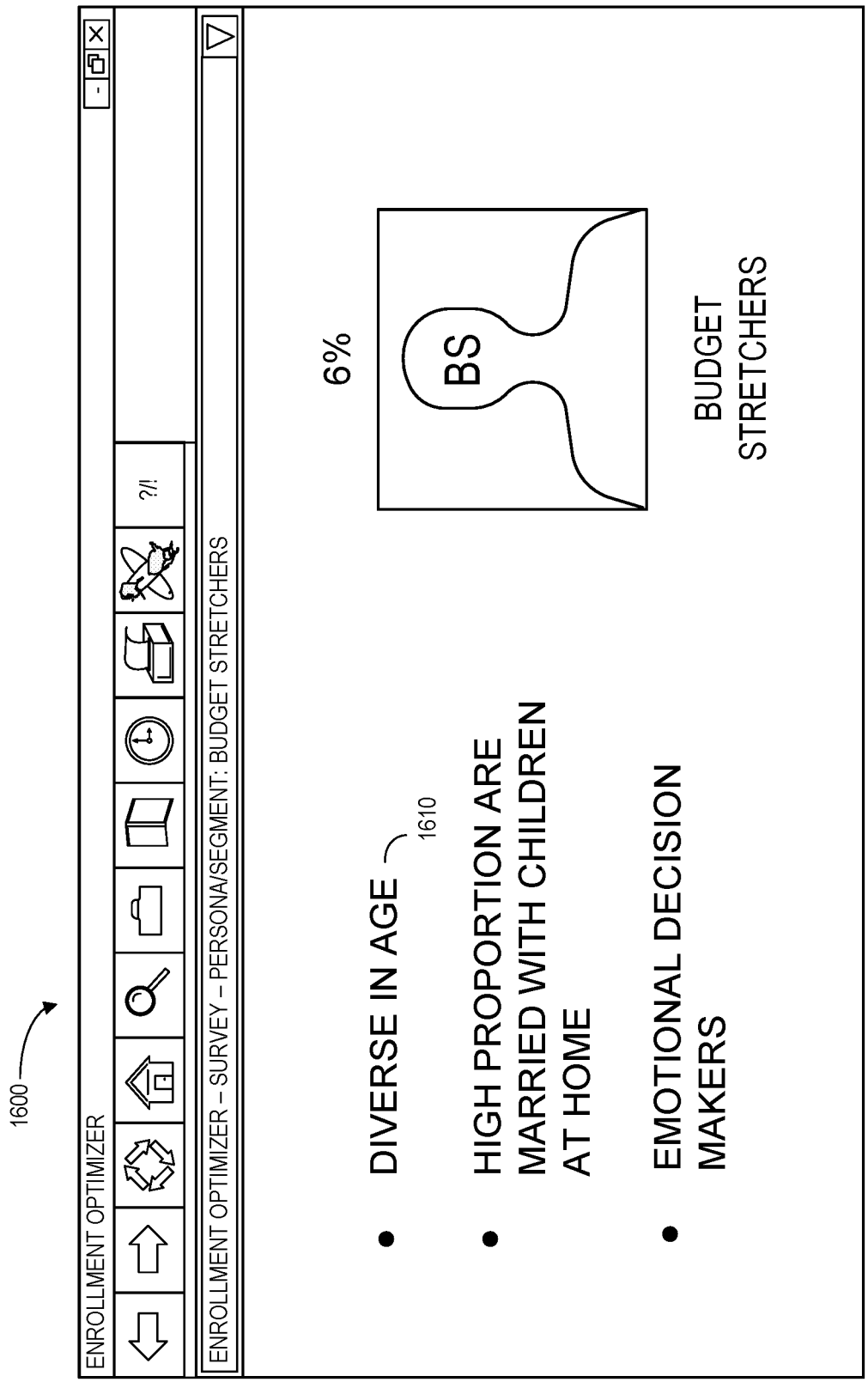
Figure 17:
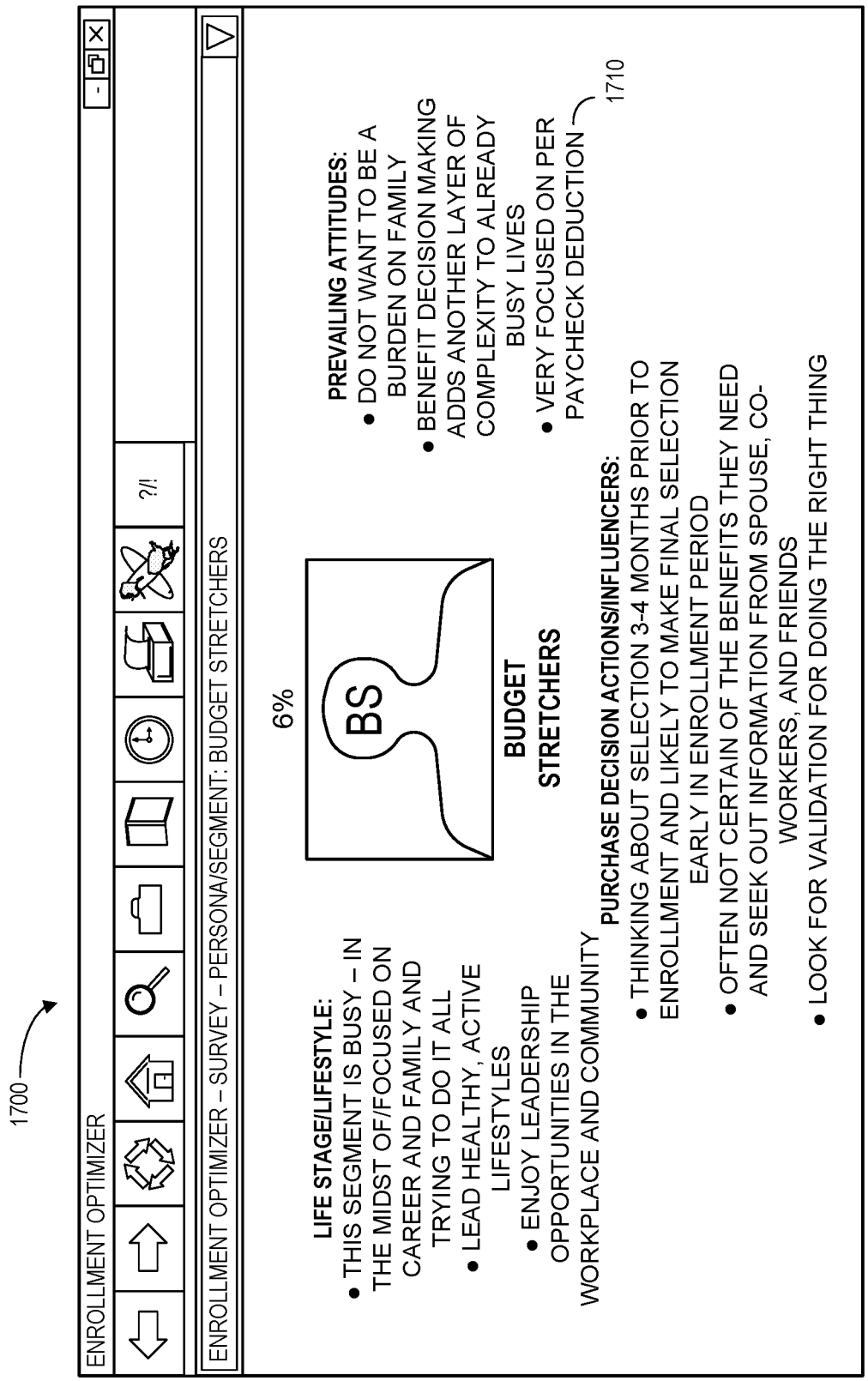

FIG. 14 illustrates an information seeker overview display 1400 that might be provided in accordance with some embodiments. The display 1400 might provide some high level descriptions 1410 about that particular persona or segment. In particular, information seekers may be concerned with health related problems, view family members as key influencers, be well educated, etc. FIG. 15 illustrates an information seeker detailed display 1500 that might be provided in accordance with some embodiments. The display 1500 might provide more detailed descriptions 1510 about that particular persona or segment, including life stage/lifestyle information, prevailing attitude information, and/or purchase decision actions/influencers. As another example, FIG. 16 illustrates a budget stretcher overview display 1600 that might be provided in accordance with some embodiments. In particular, budget stretchers may be diverse in age 1610, likely to be married with children at home, be emotional decision makers, etc. Similarly, FIG. 17 illustrates a budget stretcher detailed display 1700 that might be provided in accordance with some embodiments. As before, the display 1700 might provide more detailed descriptions 1710 about that particular persona or segment, including life stage/lifestyle information, prevailing attitude information, and/or purchase decision actions/influencers.

Figure 18:
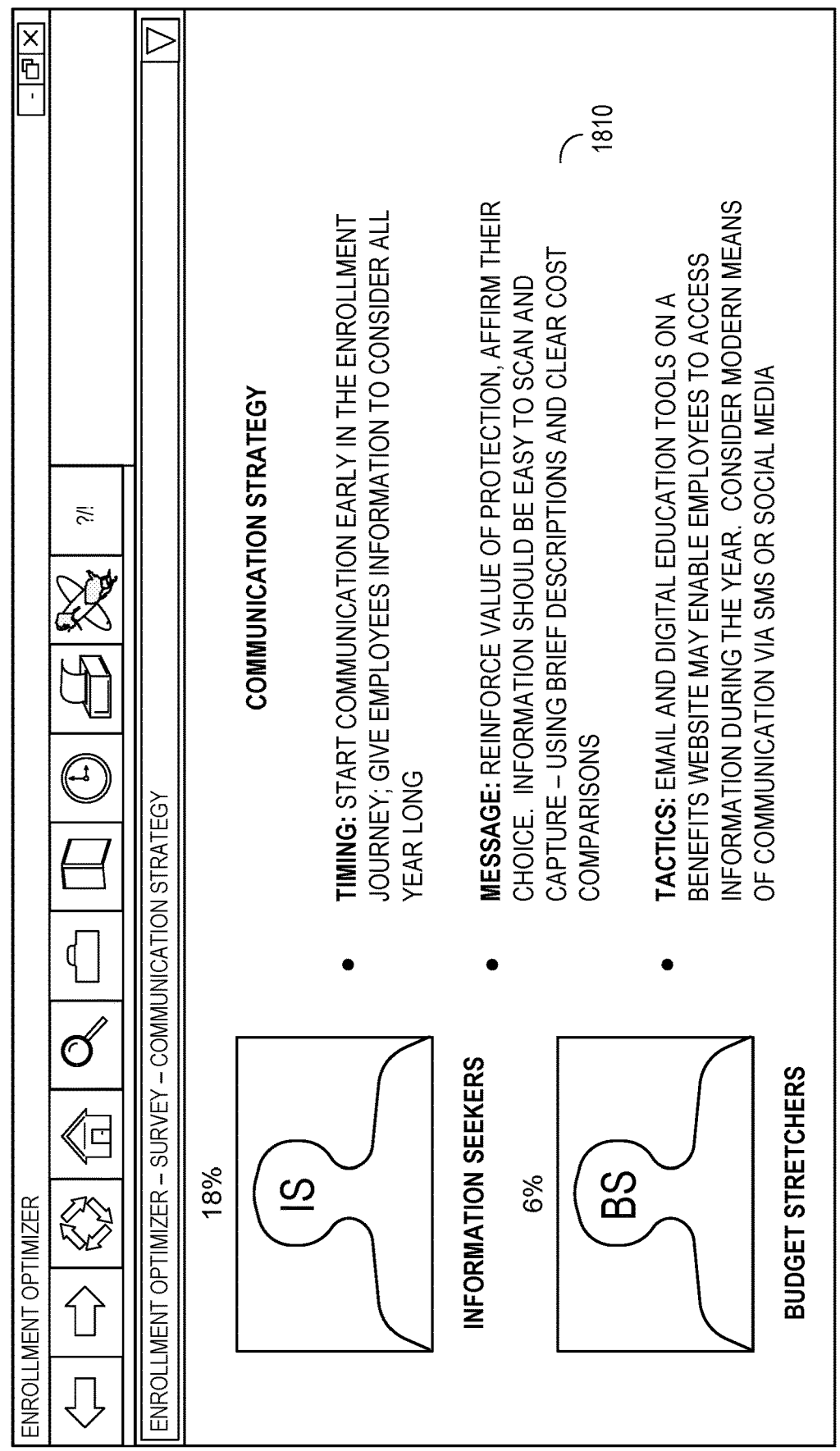

The enrollment optimization report may further include one or more recommendations as to the most efficient way to communicate with various persona or segments. For example, FIG. 18 illustrates a communication strategy display 1800 that might be provided in accordance with some embodiments. The strategy display 1800 might include, for example, recommendations 1810 about both what a message should include as well as when a message should be delivered to an employee. Thus, such a display 1800 may help a user determine appropriate timing, messages, and/or tactics to effectively encourage employee participation in one or more voluntary group benefit insurance plans being offered by an employer and/or an insurance company.

Figure 19:
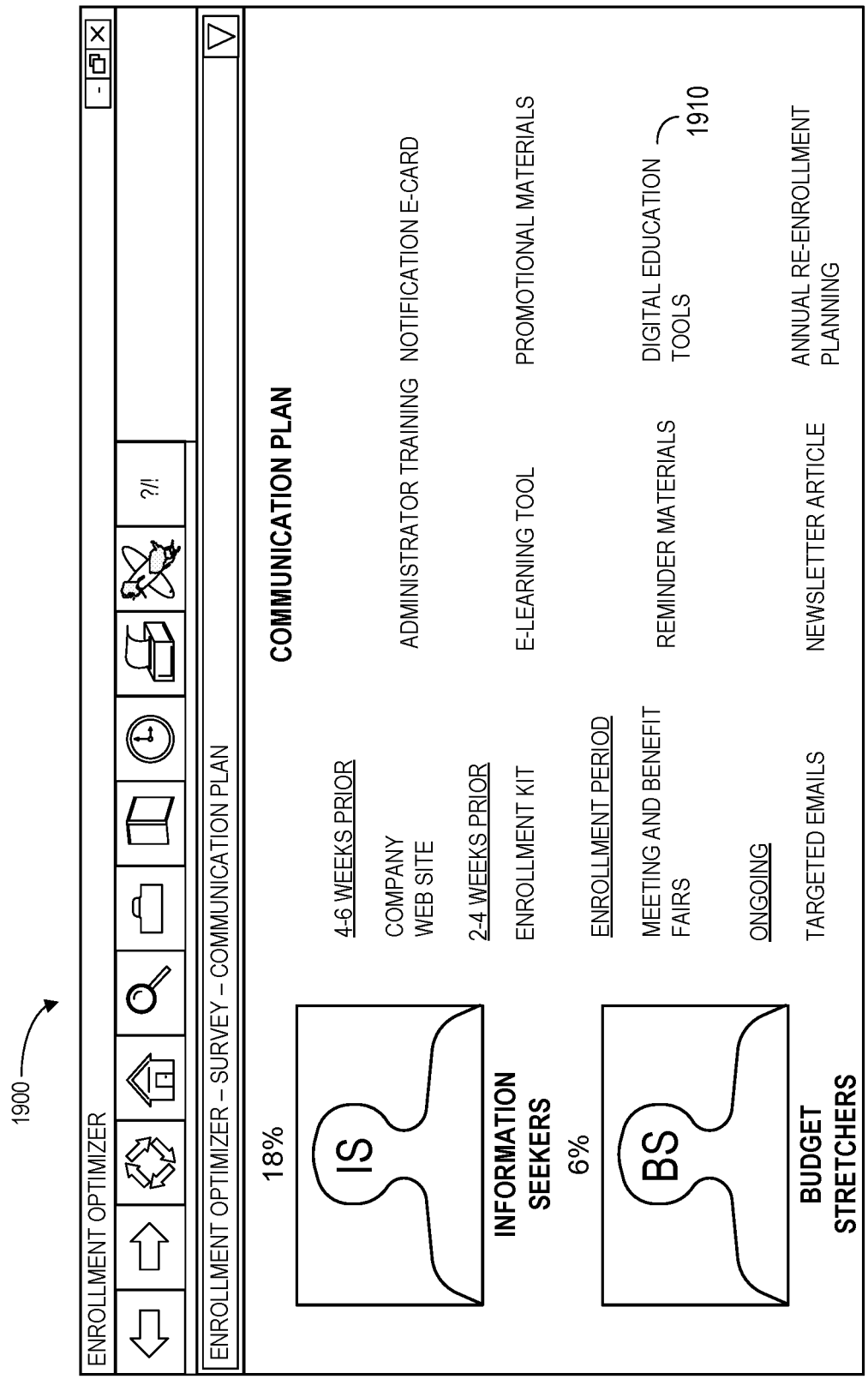

While the communication strategy display 1800 provides high-level information, the optimization report may also include more detailed recommendations. For example, FIG. 19 illustrates a communication plan display 1900 that might be provided in accordance with some embodiments. The communication plan display 1900 includes a series of communication events 1910, each being associated with a particular time period: 4-6 weeks prior to enrollment, 2-4 weeks prior to enrollment, the enrollment period, and ongoing communications with employees. As used herein, the phrase "communication event" might be associated with, for example, a website notice, administrator training, a notification ecard, an enrollment kit, an e-learning tool, promotional materials, a meeting, a benefit fair, reminder materials, digital education tools, a targeted email, a newsletter article, and/or annual re-enrollment planning materials.

Figure 20:
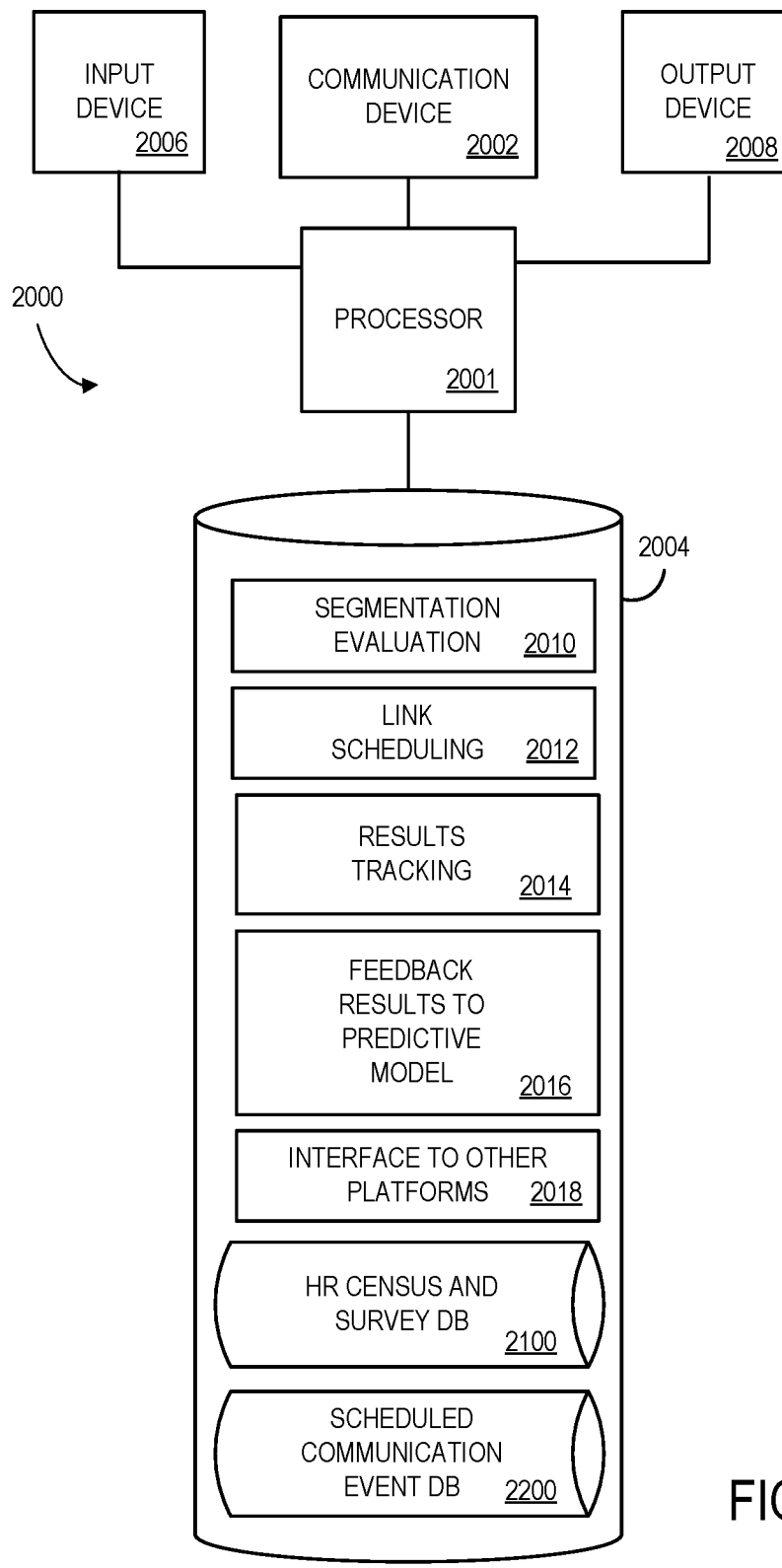
FIG. 20 is a block diagram that illustrates a server or platform in accordance with some embodiments.

Note that embodiments described herein may be implemented using any of a number of different hardware configurations. In particular, FIG. 20 is a block diagram that illustrates a server 2000 in accordance with some embodiments. In its hardware aspects the server 2000 may be entirely conventional, but programmed to provide functionality as described herein.

As depicted, the server 2000 includes a computer processor 2001 operatively coupled to a communication device 2002, a storage device 2004, an input device or devices 2006 and an output device 2008. The communication device 2002 may be used to facilitate communication with, for example, other servers/terminals/PCs coupled to a distributed data communication network. The input device(s) 2006 may comprise, for example, a keyboard, a keypad, a mouse or other pointing device, a microphone, knob or a switch, an Infra-Red ("IR") port, a docking station, and/or a touch screen. The input device(s) 2006 may be used, for example, to enter information (e.g., defining persona). Output device 2008 may comprise, for example, a display (e.g., a display screen), a speaker, and/or a printer to provide enrollment optimization recommendations, reports, etc.

The storage device 2004 may comprise any appropriate information storage device, including combinations of magnetic storage devices (e.g., magnetic tape and hard disk drives), optical storage devices, and/or semiconductor memory devices such as Random Access Memory ("RAM") devices and Read Only Memory ("ROM") devices.

The storage device 2004 stores one or more programs or portions of programs (at least some of which being indicated by blocks 2010 through 2018) for controlling the processor 2001. The processor 2001 performs instructions of the programs, and thereby operates in accordance with the present invention. In some embodiments, the programs may include a program or program module 2010 that programs the server 2000 to perform segmentation logic.

Another program or program module stored on the storage device 2004 is indicated at block 2012 and is operative to allow the server 2000 to assign and manage communication links (e.g., automated emails, telephone calls, etc.) with employees (e.g., 2 weeks before an enrollment period).

Still another program or program module stored on the storage device 2004 is indicated at block 2014. The program (or program module) 2014 may program the server 2000 to track the progress of employee participation in voluntary group benefit insurance programs. Such progress may be tracked, for example, based on enrollment data (e.g., a percentage of employees who have committed to purchase the insurance product).

Another program/program module 2016 programs the server 2000 to provide feedback results to a predictive model. Such an approach may "fine tune" the model so that it remains effective even as employee personas shift over time.

A further program/program module 2018 provides an interface between other program functions of the server 2000 and, for example, monitor devices, insurance policy databases, HR database, etc. According to some embodiments, this program/program module 2018 may further facilitate the generation of automatic alert signals based on data received from another system (e.g., when a participate rate falls below a pre-determined threshold for a particular persona or segment).

There may also be stored in the storage device 2004 other software, such as one or more conventional operating systems, device drivers, communications software, database management software, etc.

Still further, various kinds of data needed for operation of the server 2000 may be stored in the storage device 2004, including for example, an HR census and survey (e.g., resource status) database 2100 and a scheduled communication event database 2200 automatically updated by the processor 2001. According to some embodiments, the system might not store any of the information in the databases 2100, 2200. This is, the system might use the information to create reports, recommendations, etc. and not keep a copy of any of the information. According to other embodiments, to satisfy privacy concerns the system may de-identify (e.g., make anonymous) the information in the databases 2100, 2200. For example, the system might delete, encrypt, scramble, and/or substitute fake information (e.g., for the employee identifier 2102 and communication identifier 2104) to maintain employee privacy.

Figure 21:
FIG. 21 is a tabular portion of a resource status database that might be provided in accordance with some embodiments.

Referring to FIG. 21, a table is shown that represents an HR census and survey (e.g., resource statue) database 2100 that may be stored at a segmentation or scheduling server, tool, or platform according to some embodiments. The table may include, for example, entries that may be associated with workers. The table may also define fields 2102, 2104, 2106, 2108, 2110 for each of the entries. The fields 2102, 2104, 2106, 2108, 2110 may, according to some embodiments, specify: an employee identifier 2102, a communication address or identifier 2104, an age 2106, a gender 2108, and marital status 2110. The HR census and survey database 2100 may be created and updated, for example, as information is received from an enterprise, HR database, etc.

The employee identifier 2102 may be, for example, a unique alphanumeric code identifying an employee who works for an enterprise. The communication address or identifier 2104 may be, for example, a telephone number, email address, etc. that may be used to contact the employee. The age 2106, gender 2108, and marital status 2110 may each represent that employee's current situation. This information may be user, for example, to assign the employee to a particular persona or segment.

Figure 22:
FIG. 22 is a tabular portion of a scheduled communication event database that might be provided in accordance with some embodiments.

Referring to FIG. 22, a table is shown that represents a scheduled communication event database 2200 (e.g., a scheduled communication event or postal delivery database) that may be stored at a segmentation or scheduling server, tool, or platform according to some embodiments. The table may include, for example, entries that may be associated with workers who may be eligible to participate in a voluntary group benefit insurance program. The table may also define fields 2202, 2204, 2206, 2208, 2210 for each of the entries. The fields 2202, 2204, 2206, 2208, 2210 may, according to some embodiments, specify: an employee identifier 2202, a communication address or identifier 2204, a segment 2206, a next scheduled communication 2208, and physical delivery 2210. The scheduled communication event database 2200 may be created and updated, for example, as information is received from a segmentation server, scheduling server, a communication server, a fulfillment center, etc.

The employee identifier 2202 may be, for example, a unique alphanumeric code identifying an employee who works for an enterprise and may be based on or associated with the employee identifier 2102 in the HR census and survey database 2100. The communication address or identifier 2204 may be, for example, a telephone number, email address, etc. that may be used to contact the employee and may be based on or associated with the communication identifier 2104 in the HR census and survey database 2100. The segment 2206 might, for example, indicate a particular persona or segment to which the employee has been automatically assigned (e.g., information seeker, budget stretcher, etc.). The next scheduled communication 2208 might indicate the next communication link that is scheduled (e.g., and may be, for example, one week before an enrollment period or benefits fair). The physical delivery 2210 might indicate an information package, instructional DVD, etc. that will be delivered to the employee by postal mail in connection with a currently scheduled communication, the next scheduled communication 2208, etc.

According to some embodiments, one or more predictive models may be used to assign employees to persona (segments) and/or to schedule communications with employees.

Figure 23:
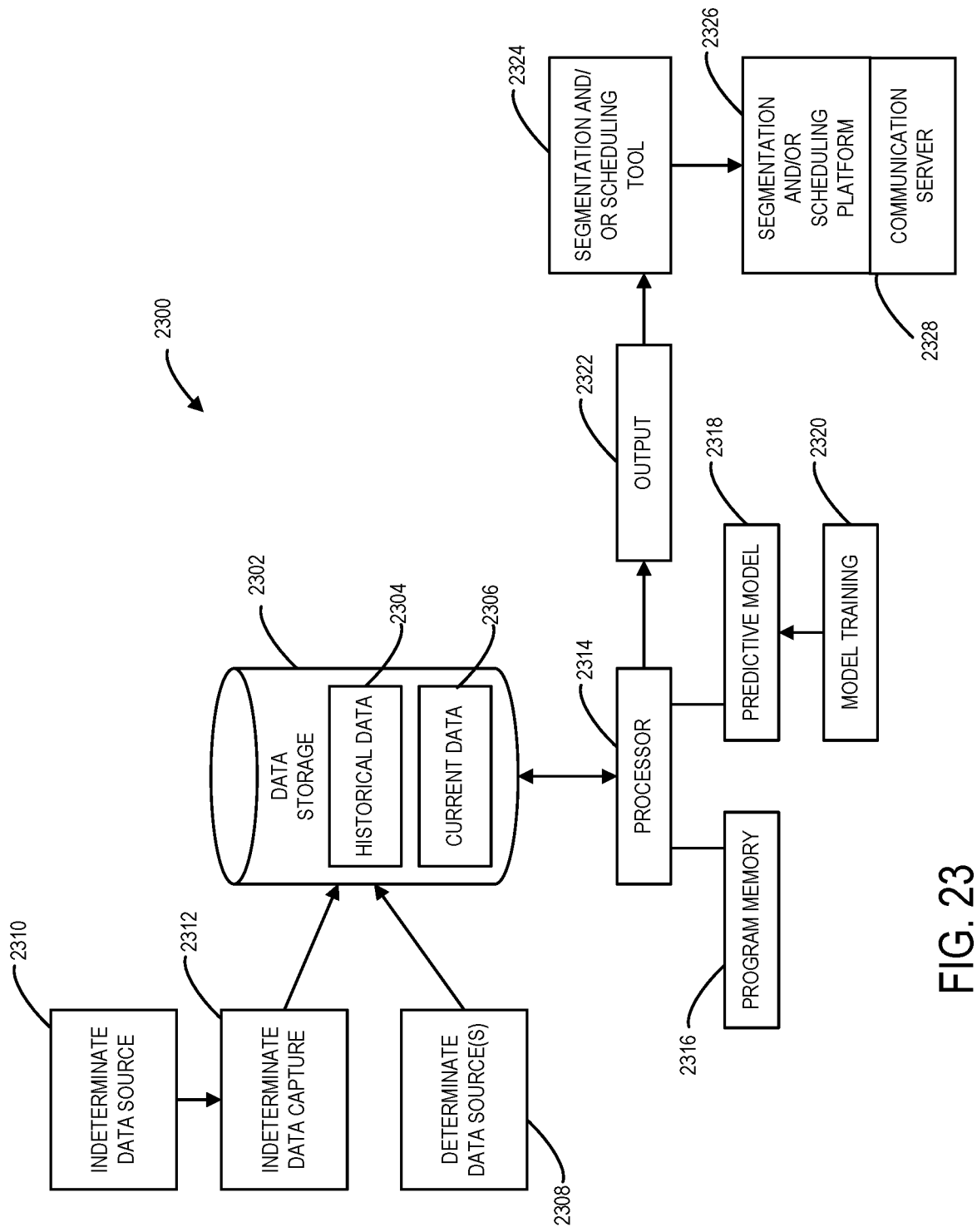
FIG. 23 illustrates a system that may be associated with a predictive model according to some embodiments.

Features of some embodiments associated with a predictive model will now be described by first referring to FIG. 23. FIG. 23 is a partially functional block diagram that illustrates aspects of a computer system 2300 provided in accordance with some embodiments of the invention. For present purposes it will be assumed that the computer system 2300 is operated by an insurance company or employer (not separately shown) for the purpose of supporting automated segmentation and scheduling indications.

The computer system 2300 includes a data storage module 2302. In terms of its hardware the data storage module 2302 may be conventional, and may be composed, for example, by one or more magnetic hard disk drives. A function performed by the data storage module 2302 in the computer system 2300 is to receive, store and provide access to both historical transaction data (reference numeral 2304) and current transaction data (reference numeral 2306). As described in more detail below, the historical transaction data 2304 is employed to train a predictive model to provide an output that indicates which employees participated in various insurance plans, and the current transaction data 2306 is thereafter analyzed by the predictive model. Moreover, as time goes by, and results become known from processing current transactions, at least some of the current transactions may be used to perform further training of the predictive model. Consequently, the predictive model may thereby adapt itself to changing recommendation results.

Either the historical transaction data 2304 or the current transaction data 2306 might include, according to some embodiments, determinate and indeterminate data. As used herein and in the appended claims, "determinate data" refers to verifiable facts such as the an age of a home; an automobile type; a policy date or other date; an employee age; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files.

The determinate data may come from one or more determinate data sources 2308 that are included in the computer system 2300 and are coupled to the data storage module 2302. The determinate data may include "hard" data like a claimant's name, date of birth, social security number, type of injury, job title, policy number, address, etc. One possible source of the determinate data may be the insurance company's policy database and/or employer's HR database (not separately indicated).

The indeterminate data may originate from one or more indeterminate data sources 2310, and may be extracted from raw files or the like by one or more indeterminate data capture modules 2312. Both the indeterminate data source(s) 2310 and the indeterminate data capture module(s) 2312 may be included in the computer system 2300 and coupled directly or indirectly to the data storage module 2302. Examples of the indeterminate data source(s) 2310 may include data storage facilities for document images, for text files, and digitized recorded voice files. Examples of the indeterminate data capture module(s) 2312 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual.

The computer system 2300 also may include a computer processor 2314. The computer processor 2314 may include one or more conventional microprocessors and may operate to execute programmed instructions to provide functionality as described herein. Among other functions, the computer processor 2314 may store and retrieve historical insurance transaction data 2304 and current transaction data 2306 in and from the data storage module 2302. Thus the computer processor 2314 may be coupled to the data storage module 2302.

The computer system 2300 may further include a program memory 2316 that is coupled to the computer processor 2314. The program memory 2316 may include one or more fixed storage devices, such as one or more hard disk drives, and one or more volatile storage devices, such as RAM devices. The program memory 2316 may be at least partially integrated with the data storage module 2302. The program memory 2316 may store one or more application programs, an operating system, device drivers, etc., all of which may contain program instruction steps for execution by the computer processor 2314.

The computer system 2300 further includes a predictive model component 2318. In certain practical embodiments of the computer system 2300, the predictive model component 2318 may effectively be implemented via the computer processor 2314, one or more application programs stored in the program memory 2316, and computer stored as a result of training operations based on the historical transaction data 2304 (and possibly also data received from a third party). In some embodiments, data arising from model training may be stored in the data storage module 2302, or in a separate computer store (not separately shown). A function of the predictive model component 2318 may be to determine appropriate recommendations of what should be included in employee communications (and/or how communications with different types of employees should be scheduled). The predictive model component may be directly or indirectly coupled to the data storage module 2302.

The predictive model component 2318 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 2300 includes a model training component 2320. The model training component 2320 may be coupled to the computer processor 2314 (directly or indirectly) and may have the function of training the predictive model component 2318 based on the historical transaction data 2304 and/or information about employees. (As will be understood from previous discussion, the model training component 2320 may further train the predictive model component 2318 as further relevant data becomes available.) The model training component 2320 may be embodied at least in part by the computer processor 2314 and one or more application programs stored in the program memory 2316. Thus the training of the predictive model component 2318 by the model training component 2320 may occur in accordance with program instructions stored in the program memory 2316 and executed by the computer processor 2314.

In addition, the computer system 2300 may include an output device 2322. The output device 2322 may be coupled to the computer processor 2314. A function of the output device 2322 may be to provide an output that is indicative of (as determined by the trained predictive model component 2318) particular recommendations. The output may be generated by the computer processor 2314 in accordance with program instructions stored in the program memory 2316 and executed by the computer processor 2314. More specifically, the output may be generated by the computer processor 2314 in response to applying the data for the current injured worker to the trained predictive model component 2318. The output may, for example, be a "yes" or "no" indication, a communication template, or a numerical rating. In some embodiments, the output device 2322 may be implemented by a suitable program or program module executed by the computer processor 2314 in response to operation of the predictive model component 2318.

Still further, the computer system 2300 may include a segmentation and/or scheduling tool or module 2324. The segmentation and/or scheduling tool or module 2324 may be implemented in some embodiments by a software module executed by the computer processor 2314. The segmentation and/or scheduling tool or module 2324 may have the function of rendering a portion of the display on the output device 2322. Thus the segmentation and/or scheduling tool or module 2324 may be coupled, at least functionally, to the output device 2322. In some embodiments, for example, the segmentation and/or scheduling tool or module 2324 may direct workflow by referring, to a segmentation and/or scheduling platform 2326, current recommendation results generated by the predictive model component 2318 and found to be associated with various results or scores. In some embodiments, these recommendations may be provided to a communication server 2328 that may be used facilitate email messages, web portal notices, etc. to employees.

Figure 24:
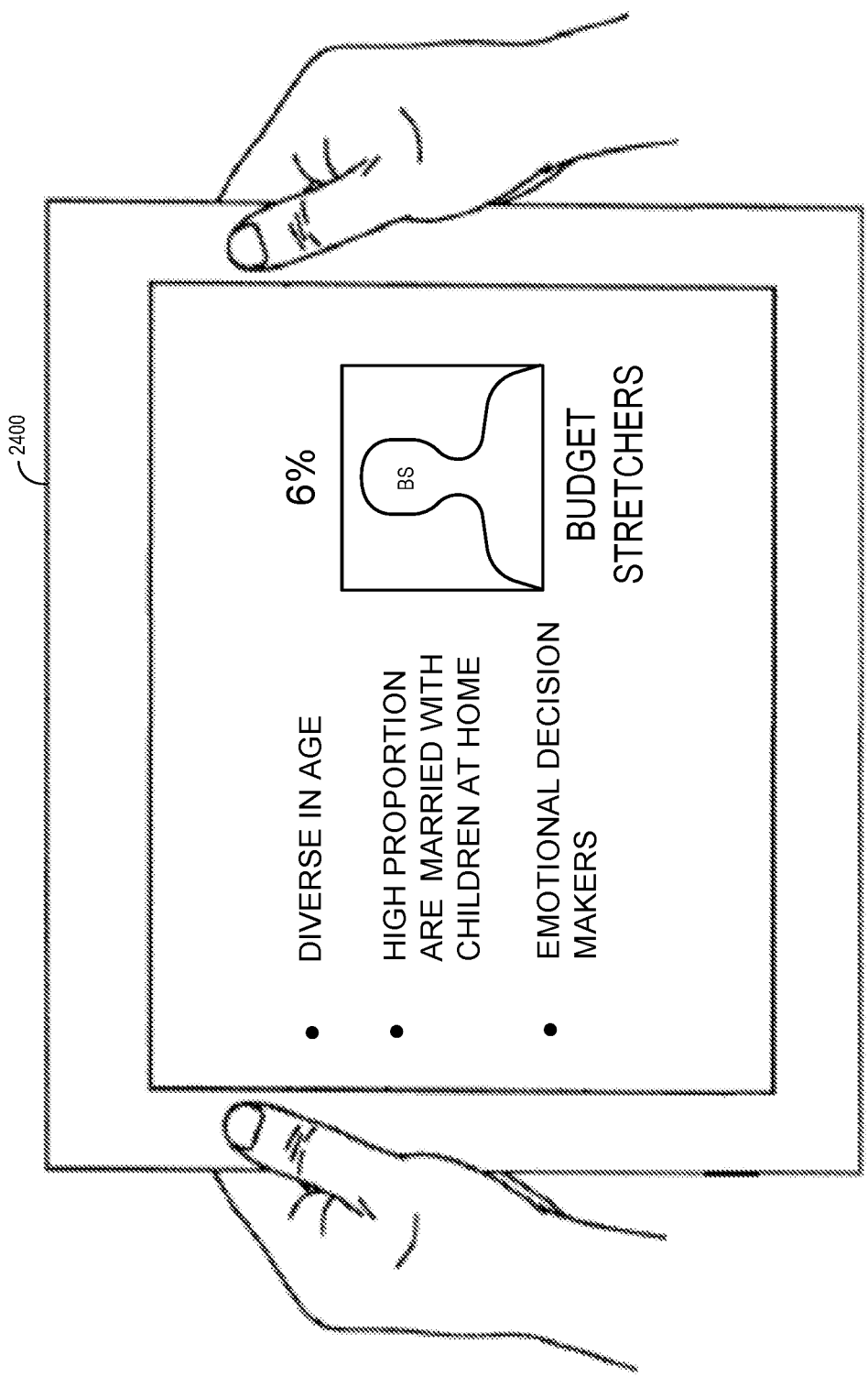
FIG. 24 is display illustrating a portion of a display that might be provided via a tablet computer in accordance with any of the embodiments described herein.

Although specific hardware and data configurations have been described herein, note that any number of other configurations may be provided in accordance with embodiments of the present invention (e.g., some of the information associated with the databases described herein may be combined or stored in external systems). Additionally, one or more of the elements described herein may be practiced in a distributed cloud computing environment where tasks are performed by logically or physically remote processing devices that are linked through one or more communications networks. For example, FIG. 24 illustrates a handheld tablet 2400 high level persona description display 2410 for budget stretchers according to some embodiments described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system for segmenting and scheduling associated with a distributed communications network, comprising:
   (a) a communication device database storing information about a plurality of communication devices, including at least one communication address associated with each communication device, wherein each communication device is associated with an employee of an employer;
   (b) an employee status database storing a plurality of data item elements for each employee of the employer; and
   (c) a network based segmentation server of an insurer, separate from and independent of the employer, in communication with the communication device database and the employee status database, programmed to:
      (i) access information in the employee status database,
      (ii) train at least one predictive model with results from current transactions such that the at least one predictive model adapts to changing conditions,
      (iii) automatically assign each employee to an employee segment, of a set of potential employee segments, based on the at least one predictive model, information in the employee status database, and historical buying behaviors associated with voluntary purchases of group benefit insurance products offered for sale by the insurer directly to other employees of other employers, said set of potential employee segments including a budget-stretchers segment, an information-seekers segment, and a mature-and-secure segment, and
      (iv) transmit information about the employee segments; and
   (d) a scheduling server of the insurer, coupled to the segmentation server, programmed to:
      (v) receive a selection of a subset of the set of potential employee segments,
      (vi) receive the information about the employees assigned to each of the selected subset of potential employee segments from the segmentation server,
      (vii) automatically schedule a series of communication events with communication devices in accordance with the employees assigned to the selected subset of potential employee segments, using the communication addresses, via the distributed communication network, wherein the communication events are associated with voluntary group benefit insurance products offered for sale by the insurer directly to the employees of the employer, and
      (viii) arrange for communication links to be established for employees assigned to the selected subset of potential employee segments in accordance with the scheduled series of communication events.

2. The system of claim 1, wherein the distributed communication network is associated with at least one of a public switched telephone network, the Internet, and a web portal.

3. The system of claim 1, wherein the identified communication device is associated with at least one of: a telephone, a personal computer, a smartphone, a smartwatch, a tablet computer, and a chat interface.

4. The system of claim 3, wherein the scheduling server is further programmed to:
   (viii) automatically arrange for a physical item to be delivered to a postal address associated with the communication device in connection with at least some of the scheduled series of communication events.

5. The system of claim 1, wherein employee segments are based on human resource census data of the employer that is specified and uploaded by the employer to the insurer, including a number of employees, gender information, salary information, and age information.

6. The system of claim 5, wherein employee segments are further based on supplemental information, including at least one of: a level of education, a family status, an employment status, geographic information, answers to survey questions, a description of a company culture, and an indication of whether children live in a household.

7. The system of claim 1, wherein at least one of the scheduled series of communication events is associated with at least one of: a web site notice, administrator training, a notification ecard, an enrollment kit, an e-learning tool, promotional materials, a meeting, a benefit fair, reminder materials, digital education tools, a targeted email, a newsletter article, and annual re-enrollment planning materials.

8. The system of claim 1, wherein the system is further to output at least one of: (i) an employee snapshot, (ii) a persona breakdown with benchmarking, (iii) a participation analysis, (iv) persona attributes, (v) a communication strategy describing timing, messaging, and tactics appropriate for the selected subset of potential resource segments, and (vi) a communication plan and timeline template appropriate for the selected subset of potential resource segments.

9. A computer-implemented method for segmenting and scheduling associated with a distributed communications network, comprising:
storing into a communication device database information about a plurality of communication devices, including at least one communication address associated with each communication device, wherein each communication device is associated with an employee of an employer;
storing into an employee status database a plurality of data item elements for each employee of the employer;
training at least one predictive model with results from current transactions such that the at least one predictive model adapts to changing conditions;
utilizing a network based segmentation server of an insurer, separate from and independent of the employer, in communication with the communication device database and the employee status database, to: (i) access information in the employee status database, and (ii) automatically assign each employee to an employee segment, of a set of potential employee segments, based on the at least one predictive model, information in the employee status database, and historical buying behaviors associated with voluntary purchases of group benefit insurance products offered for sale by the insurer directly to other employees of other employers, and (iii) transmit information about the employee segments, said set of potential employee segments including a budget-stretchers segment, an information-seekers segment, and a mature-and-secure segment; and
utilizing a scheduling server of the insurer, coupled to the segmentation server, to: (iv) receive a selection of a subset of the set of potential employee segments, (v) receive the information about the employees assigned to each of the selected subset of potential employee segments from the segmentation server, (vi) automatically schedule a series of communication events with communication devices in accordance with the employees assigned to the selected subset of potential employee segments, using the communication addresses, via the distributed communication network, wherein the communication events are associated with voluntary group benefit insurance products offered for sale by the insurer directly to the employees of the employer, and (vii) arrange for communication links to be established for employees assigned to the selected subset of potential employee segments in accordance with the scheduled series of communication events.

10. The method of claim 9, wherein the distributed communication network is associated with at least one of a public switched telephone network, the Internet, and a web portal.

11. The method of claim 9, wherein the identified communication device is associated with at least one of: a telephone, a personal computer, a smartphone, a smartwatch, a tablet computer, and a chat interface.

12. The method of claim 9, wherein the scheduling server is further to: (viii) automatically arrange for a physical item to be delivered to a postal address associated with the communication device in connection with at least some of the scheduled series of communication events.

13. The method of claim 9, wherein employee segments are based on human resource census data of the employer that is specified and uploaded by the employer to the insurer, including a number of employees, gender information, salary information, and age information.

14. The method of claim 9, wherein employee segments are further based on supplemental information, including at least one of: a level of education, a family status, an employment status, geographic information, answers to survey questions, a description of a company culture, and an indication of whether children live in a household.

15. A non-transitory, computer-readable medium storing instructions, that, when executed by a processor, cause the processor to perform a method for segmenting and scheduling associated with a distributed communications network, the method comprising:
storing into a communication device database information about a plurality of communication devices, including at least one communication address associated with each communication device, wherein each communication device is associated with an employee of an employer;
storing into an employee status database a plurality of data item elements for each employee of the employer;
training at least one predictive model with results from current transactions such that the at least one predictive model adapts to changing conditions;
utilizing a network based segmentation server of an insurer, separate from and independent of the employer, in communication with the communication device database and the employee status database, to: (i) access information in the employee status database, and (ii) automatically assign each employee to an employee segment, of a set of potential employee segments, based on the at least one predictive model, information in the employee status database, and historical buying behaviors associated with voluntary purchases of group benefit insurance products offered for sale by the insurer directly to other employees of other employers, and (iii) transmit information about the employee segments, said set of potential employee segments including a budget-stretchers segment, an information-seekers segment, and a mature-and-secure segment; and
utilizing a scheduling server of the insurer, coupled to the segmentation server, to: (iv) receive a selection of a subset of the set of potential employee segments, (v) receive the information about the employees assigned to each of the selected subset of potential employee segments from the segmentation server, (vi) automatically schedule a series of communication events with communication devices in accordance with the employees assigned to the selected subset of potential employee segments, using the communication addresses, via the distributed communication network, wherein the communication events are associated with voluntary group benefit insurance products offered for sale by the insurer directly to the employees of the employer, and (vii) arrange for communication links to be established for employees assigned to the selected subset of potential employee segments in accordance with the scheduled series of communication events.

16. The medium of claim 15, wherein the distributed communication network is associated with at least one of a public switched telephone network, the Internet, and a web portal.

17. The medium of claim 15, wherein the identified communication device is associated with at least one of: a telephone, a personal computer, a smartphone, a smartwatch, a tablet computer, and a chat interface.

18. The medium of claim 15, wherein the scheduling server is further to: (viii) automatically arrange for a physical item to be delivered to a postal address associated with the communication device in connection with at least some of the scheduled series of communication events.

19. The medium of claim 15, wherein employee segments are based on human resource census data of the employer that is specified and uploaded by the employer to the insurer, including a number of employees, gender information, salary information, and age information.

20. The medium of claim 15, wherein employee segments are further based on supplemental information, including at least one of: a level of education, a family status, an employment status, geographic information, answers to survey questions, a description of a company culture, and an indication of whether children live in a household.

* * * * *